US011191364B2

(12) United States Patent
Nelson et al.

(10) Patent No.: US 11,191,364 B2
(45) Date of Patent: Dec. 7, 2021

(54) FURNITURE STORAGE BASE

(71) Applicant: The Lovesac Company, Stamford, CT (US)

(72) Inventors: Shawn D. Nelson, Washington, UT (US); David M. Underwood, Hurricane, UT (US); Brian Kuchler, Hurricane, UT (US); Clint Gibson, St. George, UT (US); Troy Christiansen, St. George, UT (US)

(73) Assignee: THE LOVESAC COMPANY, Stamford, CT (US)

( * ) Notice: Subject to any disclaimer, the term of this patent is extended or adjusted under 35 U.S.C. 154(b) by 0 days.

(21) Appl. No.: 16/707,571

(22) Filed: Dec. 9, 2019

(65) Prior Publication Data

US 2020/0260879 A1 Aug. 20, 2020

Related U.S. Application Data

(60) Provisional application No. 62/806,516, filed on Feb. 15, 2019.

(51) Int. Cl.
*A47C 4/02* (2006.01)
*A47C 7/30* (2006.01)
(Continued)

(52) U.S. Cl.
CPC ............. *A47C 13/005* (2013.01); *A47C 5/12* (2013.01); *A47C 7/18* (2013.01); *A47C 7/24* (2013.01);
(Continued)

(58) Field of Classification Search
CPC .......... A47C 13/005; A47C 5/12; A47C 7/18; A47C 7/24; A47C 7/28; A47C 7/35; A47C 7/622; A47C 7/628; A47C 17/04; A47C 17/86
USPC ............. 297/188.08, 188.09, 188.1, 188.11, 297/188.12, 188.13, 440.1, 440.14, 297/452.52
See application file for complete search history.

(56) References Cited

U.S. PATENT DOCUMENTS 2,466,204 A * 4/1949 Brown .................. A47C 3/029
297/115
2,793,685 A * 5/1957 Spitz ..................... A47C 17/34
297/411.27
(Continued)

FOREIGN PATENT DOCUMENTS

CN 2040337 U 7/1989

OTHER PUBLICATIONS

Pages from Homereserve.com website, https://web.archive.org/web/10180812044005/http://homereserve.com/#, Aug. 12, 2018 (10 pgs).
(Continued)

*Primary Examiner* — Rodney B White
(74) *Attorney, Agent, or Firm* — Workman Nydegger

(57) ABSTRACT

A modular furniture assembly includes a transverse member and a base member. The base member includes a base frame having a bottom panel and side panels, each of the side panels having an upper chamfered edge. The base member also includes a storage cavity at least partially defined by the bottom panel and the side panels and a lid configured to be selectively mounted on the base frame such that the lid covers the storage cavity.

23 Claims, 16 Drawing Sheets

(51) Int. Cl.
  *A47C 7/62* (2006.01)
  *A47C 13/00* (2006.01)
  *A47C 17/86* (2006.01)
  *A47C 17/04* (2006.01)
  *A47C 5/12* (2006.01)
  *A47C 7/18* (2006.01)
  *A47C 7/24* (2006.01)
  *A47C 7/28* (2006.01)
  *B68G 5/00* (2006.01)
  *B68G 7/05* (2006.01)
  *A47C 7/35* (2006.01)
  *B29C 45/14* (2006.01)
  *B29L 31/58* (2006.01)

(52) U.S. Cl.
  CPC .............. *A47C 7/28* (2013.01); *A47C 7/35* (2013.01); *A47C 7/628* (2018.08); *A47C 17/04* (2013.01); *A47C 17/86* (2013.01); *B29C 45/14* (2013.01); *B68G 5/00* (2013.01); *B68G 7/05* (2013.01); *A47C 7/622* (2018.08); *B29L 2031/58* (2013.01)

(56) References Cited

U.S. PATENT DOCUMENTS

| | | | |
|---|---|---|---|
| 3,030,146 A * | 4/1962 | Faxon | A47C 4/02 297/440.1 X |
| 4,032,188 A * | 6/1977 | Jones | A47C 11/00 297/232 |
| 4,062,584 A | 12/1977 | Pinkham | |
| 4,077,666 A * | 3/1978 | Heumann | A47C 13/005 297/440.14 X |
| 4,523,787 A * | 6/1985 | Robinson | A47C 4/028 297/440.1 |
| 4,602,817 A * | 7/1986 | Raftery | A47C 4/02 297/440.1 |
| 4,711,495 A * | 12/1987 | Magder | A47C 4/028 297/452.52 |
| 4,932,720 A * | 6/1990 | Sherman | A47C 4/02 297/440.16 |
| 5,890,767 A * | 4/1999 | Chang | A47C 4/02 297/440.14 X |
| 6,050,638 A * | 4/2000 | West, III | A47C 7/62 297/188.09 X |
| 6,116,694 A * | 9/2000 | Bullard | A47C 7/287 297/452.52 X |
| 6,241,317 B1 * | 6/2001 | Wu | A47C 4/02 297/440.1 |
| 6,367,880 B1 * | 4/2002 | Niederman | A47C 4/02 297/440.14 |
| 6,595,592 B1 * | 7/2003 | Wieland | A47C 4/024 297/440.15 |
| 6,715,837 B2 * | 4/2004 | Niederman | A47C 4/02 297/440.14 |
| 6,796,614 B1 * | 9/2004 | Paul | A47C 7/42 297/440.14 X |
| 6,942,298 B2 * | 9/2005 | Harrison | A47C 4/02 297/440.1 |
| 6,952,906 B2 | 10/2005 | Nelson | |
| 6,981,747 B2 | 1/2006 | Wieland et al. | |
| 7,028,859 B2 * | 4/2006 | Moon | B65D 11/1873 297/440.1 X |
| 7,066,548 B2 * | 6/2006 | Butler | B63B 29/04 297/440.1 X |
| 7,213,885 B2 | 5/2007 | Nelson | |
| 7,255,403 B2 * | 8/2007 | Butler | B63B 29/04 297/440.1 X |
| 7,322,642 B2 * | 1/2008 | BoJack | A47B 83/001 297/188.08 X |
| 7,419,220 B2 | 9/2008 | Nelson | |
| 7,434,304 B2 * | 10/2008 | Owens | A47C 4/02 29/428 |
| 7,480,947 B2 * | 1/2009 | Patella | A47C 13/005 297/440.23 |
| 7,547,073 B2 | 6/2009 | White | |
| 7,568,767 B2 * | 8/2009 | Richardson | A47C 4/02 297/440.1 |
| 7,581,786 B1 * | 9/2009 | Wang | A47B 83/00 297/188.11 |
| 7,744,162 B2 * | 6/2010 | Griggs, Jr. | A47C 17/00 297/440.14 |
| 7,963,612 B2 | 6/2011 | Nelson | |
| 8,689,992 B2 * | 4/2014 | Anderson | A47C 1/14 220/4.01 |
| 8,764,114 B1 * | 7/2014 | Frank | A47C 13/005 297/440.14 X |
| 8,777,319 B2 * | 7/2014 | Brandtner | A47C 4/02 297/440.15 |
| 8,783,778 B2 | 7/2014 | Nelson | |
| 8,919,885 B2 * | 12/2014 | Han | A47C 3/00 297/440.1 X |
| 9,277,813 B2 | 3/2016 | Nelson | |
| 9,277,826 B2 | 3/2016 | Nelson | |
| 9,420,892 B2 * | 8/2016 | Lejcher | A47C 7/22 |
| 9,526,342 B2 * | 12/2016 | Thuma | A47C 7/626 |
| 9,596,937 B2 * | 3/2017 | Ng | A47C 4/024 |
| 9,603,448 B2 | 3/2017 | Nelson | |
| 9,668,581 B1 * | 6/2017 | Hill | A47C 4/02 |
| 9,839,295 B2 * | 12/2017 | Robinson | A47C 3/00 |
| 9,936,800 B2 | 4/2018 | Nelson | |
| 10,070,725 B2 | 9/2018 | Nelson | |
| 10,123,621 B2 | 11/2018 | Nelson | |
| 10,123,623 B2 | 11/2018 | Nelson | |
| 10,143,307 B2 | 12/2018 | Nelson | |
| 10,154,733 B2 | 12/2018 | Nelson | |
| 10,212,519 B2 | 2/2019 | Nelson | |
| 10,236,643 B2 | 3/2019 | Nelson | |
| 10,390,610 B2 | 8/2019 | Nelson | |
| 10,512,338 B1 * | 12/2019 | Hawkins | A47C 19/02 |
| 2002/0017814 A1 * | 2/2002 | Niederman | A47C 4/02 297/440.16 |
| 2003/0151295 A1 | 8/2003 | Nelson | |
| 2004/0021359 A1 * | 2/2004 | Chang | A47C 4/024 297/440.23 |
| 2004/0212240 A1 | 10/2004 | Zwezdaryk | |
| 2005/0067876 A1 * | 3/2005 | Dortch | A47C 3/00 297/440.1 |
| 2005/0179303 A1 * | 8/2005 | Owens | A47C 4/02 297/440.1 |
| 2005/0225153 A1 * | 10/2005 | Ou | A47C 17/00 297/440.1 |
| 2007/0001494 A1 | 1/2007 | Hoover | |
| 2009/0235451 A1 * | 9/2009 | Gorkin | A47C 4/022 297/440.14 X |
| 2010/0093257 A1 * | 4/2010 | Elliott | A47C 4/03 297/440.14 X |
| 2010/0264715 A1 * | 10/2010 | Griggs, Jr. | A47C 4/02 297/440.1 |
| 2012/0146382 A1 * | 6/2012 | Griggs, Jr. | A47C 4/028 297/440.1 |
| 2012/0217784 A1 * | 8/2012 | Griggs, Jr. | A47C 4/08 297/440.1 |
| 2013/0320741 A1 * | 12/2013 | Brandtner | A47C 4/028 297/440.1 |
| 2014/0139000 A1 * | 5/2014 | Ogg | A47C 7/546 297/440.1 X |
| 2016/0174715 A1 | 6/2016 | Nelson | |
| 2017/0367486 A1 | 12/2017 | Nelson | |
| 2018/0041354 A1 | 2/2018 | Nelson | |
| 2019/0142165 A1 | 5/2019 | Nelson | |
| 2019/0222935 A1 | 7/2019 | Nelson | |
| 2020/0100030 A1 | 3/2020 | Nelson | |
| 2020/0100031 A1 | 3/2020 | Nelson | |
| 2020/0221877 A1 * | 7/2020 | Hirschhaut | A47C 17/04 |
| 2020/0237098 A1 * | 7/2020 | VandenBos | A47C 9/00 |
| 2021/0093087 A1 * | 4/2021 | Zei | A47C 17/04 |
| 2021/0112341 A1 * | 4/2021 | Nelson | A61H 23/0236 |

(56) References Cited

OTHER PUBLICATIONS

Screen capture from homereserve.com website, https://web.archive.org/web/20180812044005/http://homereserve.com/#, Home Reserve—Adaptable Furniture for Everyday Life, Nov. 14, 2019 (22 pgs).
Website pages from www.westelm.com, "West Elm," printed Jun. 2, 2016 (4 pgs).
Screen capture from homereserve.com website, https://web.archive.org/web/20180812044005/http://homereserve.com/#, Home Reserve—Adaptable Furniture for Everyday Life, Aug. 12, 2018 (22 pgs).

* cited by examiner

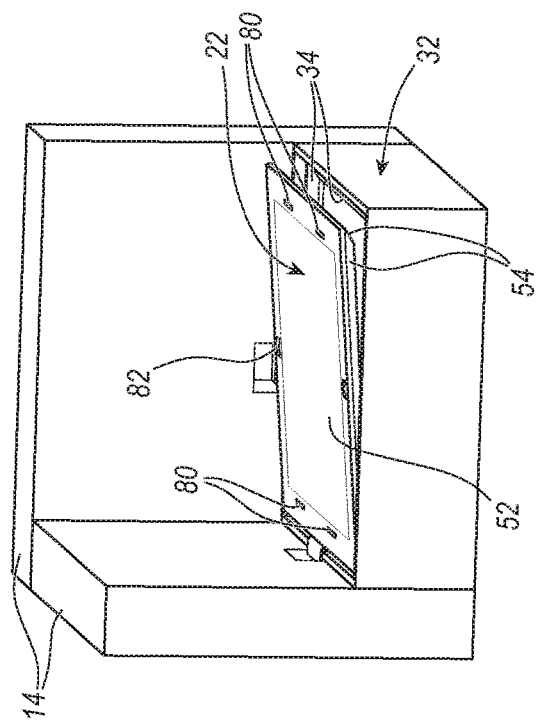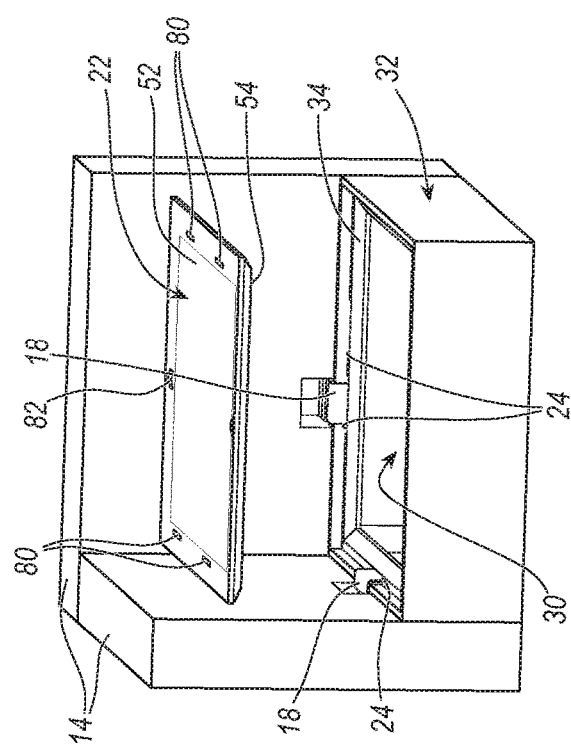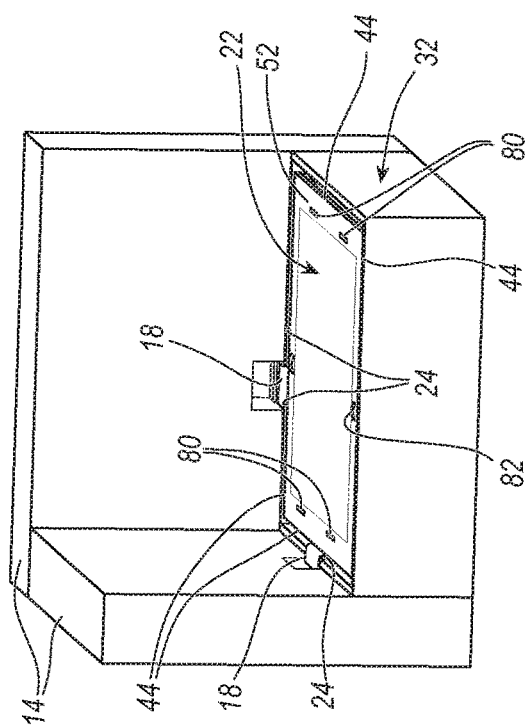
FIG. 4A
FIG. 4B
FIG. 4C

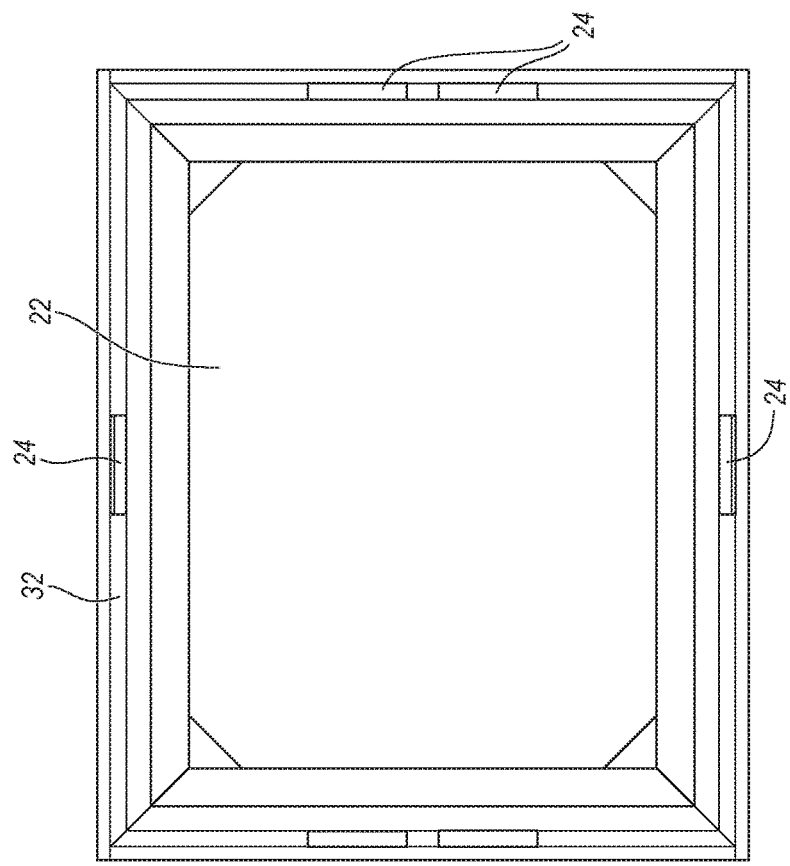
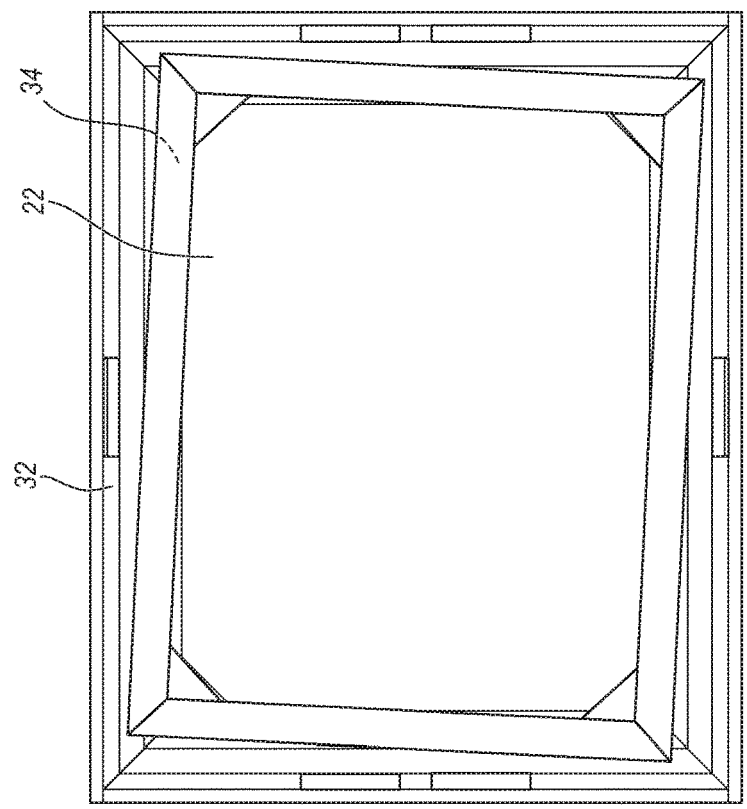
FIG. 6B
FIG. 6A

FURNITURE STORAGE BASE

CROSS-REFERENCE TO RELATED APPLICATIONS

This application claims priority to and the benefit of U.S. Provisional Patent Application No. 62/806,516, filed on Feb. 15, 2019, entitled INTEGRATED MANUFACTURING FOR MODULAR FURNITURE, which is incorporated herein in its entirety by reference.

BACKGROUND

The Field of the Invention

The present disclosure relates to furniture and furniture systems. More specifically, the present disclosure relates to furniture having storage systems.

The Relevant Technology

Homes and office spaces often lack sufficient storage space to meet the needs of residents and tenants. Such storage spaces can include closets, shelves, cupboards, drawers and pantries. These types of storage spaces may also lack convenience, in that certain closets, for example, may not be near living rooms or couches or chairs where people spend a lot of time sitting or lounging in their home. Typical homes and office spaces may lack storage spaces where they are most needed. In addition, storage spaces such as closets and cupboards can negatively affect the aesthetic design of a room, especially where modern, minimalistic designs are desired.

Some solutions have been attempted to provide more accessible storage spaces, including certain types of furniture that provide storage features. However, current furniture storage spaces fall short in providing sufficient, convenient, and aesthetically pleasing storage solutions. For example, storage spaces included in some couches or beds are often difficult to access. In addition, such storage spaces are integrated into furniture such that changing the position of the storage space requires changing the position of the furniture.

Furthermore, current furniture storage solutions require alterations to typical furniture design that can distract from the aesthetic appeal of furniture. For example, a furniture storage space built into a couch may require added dimensions of certain base portions that change the overall look of the couch. Also, storage spaces in furniture often require hinges or handles that detract from the appealing visual design of the furniture.

Accordingly, there are a number of challenges and inefficiencies in the prior art that need to be addressed in the field of furniture and furniture storage systems.

BRIEF SUMMARY OF THE INVENTION

The present disclosure relates to furniture and furniture systems. More specifically, the present disclosure relates to furniture having storage systems. In one embodiment, for example, a modular furniture assembly of the present invention includes a transverse member and a base member. The base member includes a base frame having a bottom panel and side panels, each of the side panels having an upper chamfered edge, a storage cavity at least partially defined by the bottom panel and the side panels, and a lid configured to be selectively mounted on the base frame such that the lid supports a user and covers the storage cavity.

The lid of such an embodiment can also include one or more lower chamfered edges, each of the chamfered edges of the lid corresponding to one of the upper chamfered edges. Also, the lower chamfered edges of the lid and the upper chamfered edges of the side panels are chamfered at an angle, the lower chamfered edges and the upper chamfered edges sloping downward toward the storage cavity. In one embodiment, the angle is in the range of about 10 to about 60 degrees, in the range of about 20 to about 50 degrees, or in the range of about 30 to about 40 degrees.

Also, in at least one embodiment, the bottom panel comprises one or more apertures configured to allow air to enter and escape the storage cavity through the bottom panel. The lid can include a lid frame extending around a perimeter of the lid and a spring system connected to the lid frame and extending across the lid.

In one embodiment, the furniture assembly described above also includes a cushion configured to be disposed on top of the lid during use, including a cover over the cushion. In one embodiment, the lid is selectively mounted within the cover of the cushion, forming an integrated cushion-lid assembly. In one embodiment of the furniture assembly described above, the cover includes a lower portion extending over a lower face of the cushion, the lower portion of the cover having an inside surface, the inside surface facing the cushion disposed within the cover. The cover also includes a plurality of pockets, each pocket disposed on an inside surface in a corner of the lower portion. In such an embodiment, the lid is disposed within the cover, between the lower portion of the cover and the cushion, each of the plurality of corners of the lid being inserted into one of the plurality of pockets such that the lid is secured to the cushion via the cover.

The lid is an example of a suspension system for supporting a user and/or an object on the base. A variety of other suspension systems for supporting a user and/or an object on the base can be selectively mounted within the cushion cover with the cushion, such as slats that are configured to be selectively mounted on the base, thereby forming another example of an integrated cushion-suspension assembly. The slats can be selectively mounted within the cover of a cushion assembly, for example, thereby forming an integrated cushion-suspension assembly with slats mounted within the cushion cover.

In one embodiment of the present disclosure, a modular furniture system includes a base, a transverse member, and a coupler. The base includes a base frame and a lid, the lid providing a seating surface (e.g., on which lid a cushion is placed). The transverse member has a height that is substantially greater than the height of the seating surface of the base member and the coupler selectively couples the base to the transverse member.

In such an embodiment, the base frame can be open at a top thereof and substantially closed at a bottom thereof. Also, upper edges of the base frame are chamfered at an angle and lower edges of the lid are correspondingly chamfered at the same angle so that the lid selectively nests onto the base frame and wherein the chamfered portions of the lid self-settle onto the chamfered portions of the base frame when the lid is placed onto the base frame during use.

Additionally, the above described embodiment can include a cushion configured to be placed on top of the lid during use. In such an embodiment, at least a portion of the lid comprises a flexible portion that resiliently flexes downward in the direction of the storage cavity in reaction to forces pressing downward on the lid. Also, the base frame can include one or more apertures through which air can enter and escape from the storage cavity when the flexible portion of the lid flexes downward (which slightly alters the volume between the bottom panel of the base frame and the lid, as the lid flexes).

In one embodiment, the lid is secured to a bottom surface of the cushion via a cushion cover. The lid can be secured to the cushion such that the lid holds down one or more corners of the cushion against a top of the base frame when a force pushes downward on the central portion of the cushion during use (e.g., as a user sits thereon). In one embodiment, the lid and storage cavity described above are hidden from view when a user uses the furniture system for seating.

In addition, in at least one of the above-noted embodiments of the modular furniture system, the lid is housed within an outer fabric cover of a cushion selectively positionable over the seating surface of the base, the outer fabric cover including interior pockets for receiving corners of the lid, the pockets retaining the lid within the outer fabric cover of the cushion during use. In such an embodiment, the interior pockets can be triangular, with corners of the lid being received into hypotenuse sides of the triangular pockets.

In one embodiment of the present disclosure, a modular furniture system includes a base that has a base frame. The base frame includes an upper perimeter edge defining a top plane of the base. The modular furniture system also includes a transverse member having a height that is substantially greater than the height of the upper perimeter edge.

In addition, in at least one embodiment, the modular furniture system includes a coupler for selectively coupling the base to the transverse member and the base includes a substantially closed bottom and an open top, providing an accessible storage cavity beneath the top plane of the base. In such an embodiment, the open top of the frame of the base is selectively covered by a lid that nests into the base.

In one embodiment of modular furniture system of the present invention, the length of the base is substantially equal to the sum of the width of the base and the width of the transverse member. In such an embodiment, the transverse member is conveniently interchangeable as a backrest or arm rest in a variety of different furniture configurations. Furthermore, using the configuration for modular furniture that the length of the base is substantially equal to the sum of the width of the base and the width of the transverse member, a variety of different furniture configurations can be formed from the base and transverse member, or from multiples of those components, e.g., two bases 12 and four transverse members 14, each having the configuration that the length of the base is substantially equal to the sum of the width of the base and the width of the transverse member, wherein form a sofa, for example, or a variety of different furniture configurations can be formed, such as shown in U.S. Pat. No. 7,213,885 which is incorporated herein by reference, or other patents that are incorporated herein by reference.

The various manufactured components of the present invention may include base members, and/or transverse members, e.g., for use in assembling a chair, couch, or the like, as disclosed in U.S. Pat. No. 7,213,885 entitled MODULAR FURNITURE ASSEMBLY, incorporated herein by reference in its entirety. The modular furniture components and methods disclosed in the present application may be used in connection with numerous furniture assemblies, e.g., such as, but not limited to, any similar to those disclosed in (i) U.S. Pat. No. 9,277,826, entitled MOUNTING PLATFORM FOR MODULAR FURNITURE ASSEMBLY, (ii) U.S. Pat. No. 8,783,778, entitled MOUNTING PLATFORM FOR MODULAR FURNITURE ASSEMBLY, (iii) U.S. Pat. No. 7,963,612 entitled MODULAR FURNITURE ASSEMBLY, (iv) U.S. Pat. No. 7,547,073, entitled MODULAR FURNITURE ASSEMBLY, (v) U.S. Pat. No. 7,213,885 entitled MODULAR FURNITURE ASSEMBLY, (vi) U.S. Publication No. 2017/0367486 entitled MODULAR FURNITURE ASSEMBLY CORNER SEATING SYSTEM, (vii) U.S. Pat. No. 10,212,519 entitled ELECTRONIC FURNITURE SYSTEMS WITH INTEGRATED INTERNAL SPEAKERS, (viii) U.S. Pat. No. 10,236,643 entitled ELECTRICAL HUB FOR FURNITURE ASSEMBLIES, (ix) U.S. Pat. No. 10,143,307 entitled FURNITURE SYSTEM WITH RECLINER ASSEMBLY, and (x) U.S. Pat. No. 10,123,621 entitled FURNITURE SYSTEM RECLINER ASSEMBLY WITH SLED RAILS, each of which is herein incorporated by reference in its entirety.

Another important aspect of the present invention is that access to the storage cavity within the storage bases of the present invention can be achieved without removing any couplers that connect the transverse members to the bases and without disconnecting any transverse member from a corresponding storage base. Likewise, the lid can be placed on top of the storage base without altering any other connections of the various furniture system components. Thus, access to the storage cavity within a storage base can be achieved without removing the coupler that couples a transverse member to the base, and/or a lid of a storage base can be placed onto a base frame of the storage base without altering the connection between the base and the transverse member.

Another aspect of the modular furniture assembly of the present invention includes rigid or semi-rigid spaced apart grasping strips inlaid within the flaps of the base frame covers and/or lid covers to assist the user in grasping the flaps (by providing structure for grasping the flap edges) and moving the flaps of the covers to a desired location on the base frame or lid to thereby tightly cover the base frame or lid. The base frame covers and/or lid covers may employ thus employ one or more furniture cover supports in the form of a rigid or semi rigid elongate grasping strip having a first end and a second end, and an elongate length extending along a longitudinal axis disposed between a first and second end, wherein the elongate grasping strip is associated with a furniture cover.

For example, in one embodiment of the modular furniture assembly of the present invention, a base frame cover is applied to the exterior of the base frame, the base frame cover comprising, a tube-shape having an open top end and an open bottom end for receiving a base frame, a plurality of flaps extending from the upper section and the lower section of the base frame cover, and at least two strips inlaid within an end of each flap of the plurality of flaps, wherein the at least two strips are separated by a space, and an attachment structure (e.g., a VELCRO attachment member) is disposed on each flap of the plurality of flaps. The modular furniture system of the present invention may also include a lid cover applied to the lid, the lid cover comprising, a material section sized to fully cover a top surface of the lid, at least one flap extending outward from each side of the material section, at least two strips inlaid within an outermost edge of each flap, wherein the at least two strips are separated by a space, and an attachment structure (e.g., a VELCRO attachment member) is disposed on each flap. The grasping strips inlaid within the flaps provide graspable structure and/or thickness within the flaps to thereby assist the user in grasping the flaps and moving the flaps to a desired location on the base frame or lid to thereby tightly cover the base frame or lid. Such tight-fitting in strategic locations, e.g., the interface between the lid and the base frame help make a reliable, seamless connection between the lid and the base frame.

These and other objects and features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 4A illustrates a modular furniture embodiment of a storage base and two transverse members coupled to the storage base with the storage base lid lifted off the storage base, according to the present disclosure;

FIG. 4B illustrates an embodiment of the storage base and two transverse members of FIG. 4A with the storage base lid in the process of being placed on top of the storage base, with the chamfers of the lid mating with the corresponding chamfers of the base;

FIG. 4C illustrates an embodiment of the storage base and transverse members of FIGS. 4A-C with the storage base lid properly positioned on top of the storage base, with the chamfers of the lid mating with the corresponding chamfers of the base, according to the present disclosure;

FIG. 6A illustrates a top view of an embodiment of a storage base frame with a lid placed thereon in a skewed orientation, according to the present disclosure;

FIG. 6B illustrates a top view of an embodiment of the storage base frame with a storage base lid properly placed thereon in a mating relationship with the base frame, according to the present disclosure;

DETAILED DESCRIPTION

The present disclosure relates to modular furniture and modular furniture systems. More specifically, the present disclosure relates to furniture having storage systems. The various embodiments of furniture systems and storage systems described herein provide a number of advantages over the problems presented by the prior art discussed above. For example, the furniture systems and storage systems thereof provide additional storage space within a room that is easily accessible and convenient to those using the room or furniture.

In addition, the storage spaces within furniture systems described herein are hidden from view so that the aesthetic design of the furniture or room is enhanced. Furthermore, the storage spaces described herein are modular in that they can be repositioned within a furniture system without moving or rearranging the configuration of the furniture system itself.

Figure 1:
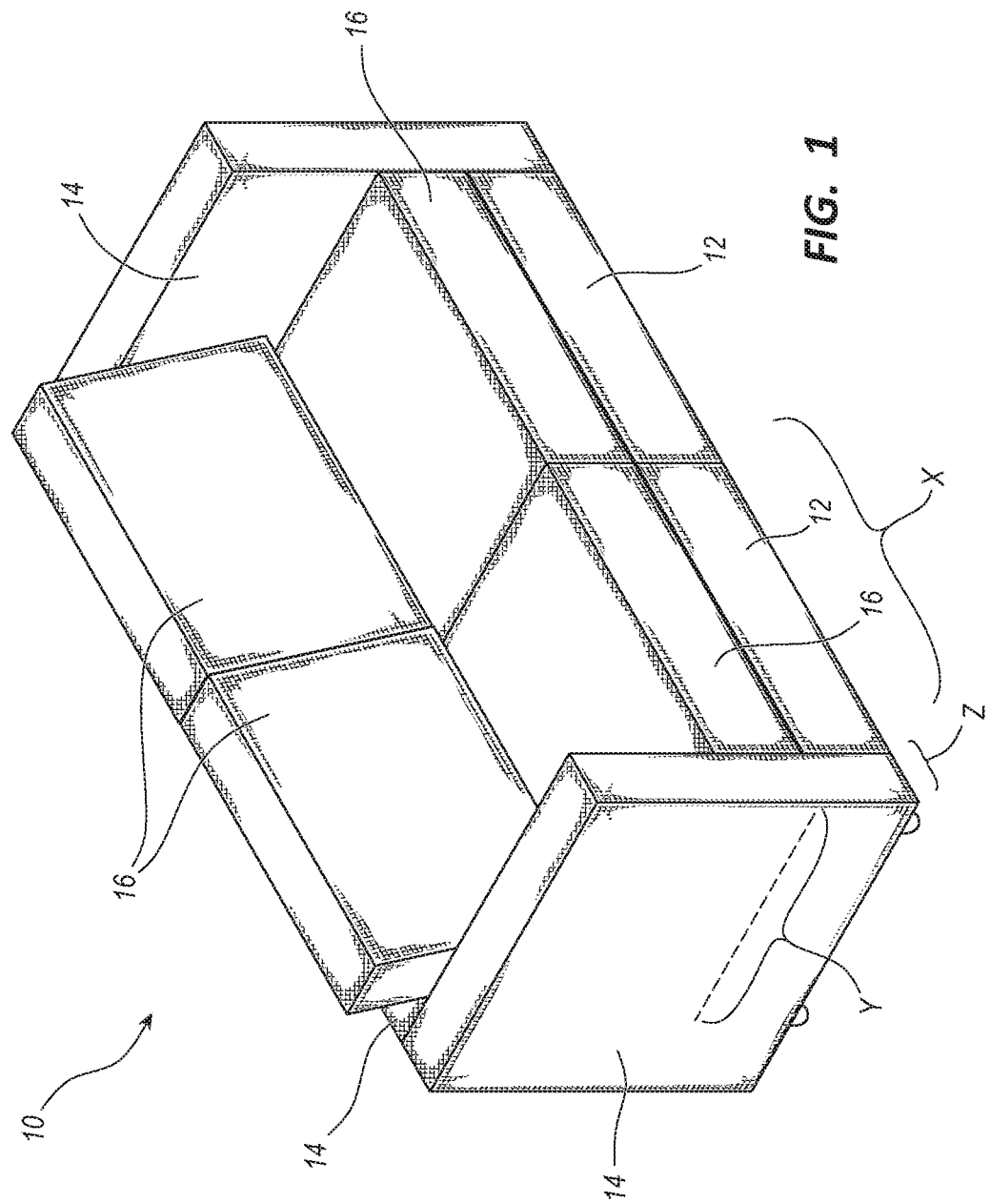
FIG. 1 illustrates an embodiment of a modular furniture system in the form of a couch, including two bases, four transverse members, and a number of cushions, according to the present disclosure.
Figure 2:
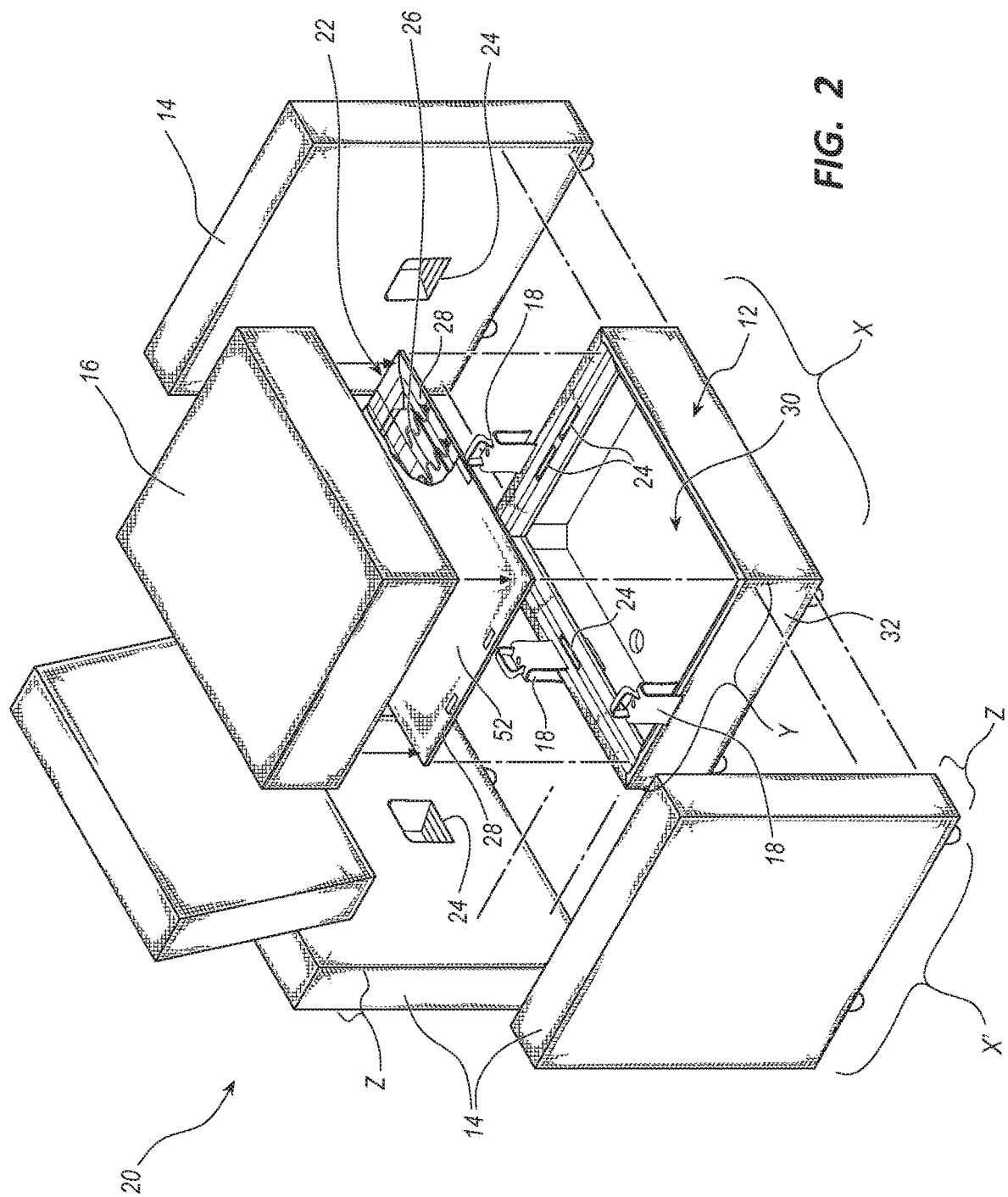
FIG. 2 illustrates an exploded view of another embodiment of a modular furniture system in the form of an armchair, including a storage base having a lid, and a cushion thereon and a plurality of couplers configured to selectively couple the various transverse members to the base in a selected configuration, according to the present disclosure; the lid cover and inner portion of the lid 22 are shown in a cutaway view in FIG. 3D.

FIG. 1 illustrates an embodiment of a modular furniture system 10 in the form of a couch, including two bases 12, four transverse members 14, and number of cushions 16 on top of bases 12. In at least one embodiment, furniture system 10 is modular in that its bases 12 transverse members 14, and cushions 16 can be added, subtracted, and repositioned relative to one another to form any number of furniture configurations. For example, in one configuration, furniture system 10 is arranged to form a two-seated couch. Furniture system 10 of FIG. 1 is an example of a modular furniture configuration having a plurality of bases 12 having substantially same configuration and a plurality of transverse members having substantially the same configuration, wherein the length X of the base is substantially equal to the sum of width Y of the base and the width Z of the transverse member (e.g., X=Y+Z), such that a variety of different furniture configurations can be formed. Furniture system 20 of FIG. 2 is also an example of a modular furniture configuration wherein the length X of the base is substantially equal to the sum of width Y of the base and the width Z of the transverse member (e.g., X=Y+Z), such that a variety of different furniture configurations can be formed. In the embodiments of FIG. 1 and FIG. 2, the length X of base 12 is also substantially equal to the length X' of transverse member 14.

Thus, in some embodiments of a furniture system 10 and furniture system 20, the length X of the base 12 is substantially equal to the sum of the width Y of the base 12 and the width Z of the transverse member 14. In addition, one or more bases 12 can be configured without any transverse members 14 to form ottomans or other seats and types of furniture systems. For example, one or more bases 12 and cushions 16 can be configured together to form a bed, including a box spring comprised of bases 12 and/or cushions 16 serving as a mattress or other padding. In another configuration, for example, furniture system 10 includes additional bases 12 and transverse members 14 to form a larger couch, an L-shaped sectional, or the like In one embodiment of modular furniture system 10, wherein the length X of the base is substantially equal to the sum of the width Y of the base and the width Z of the transverse member, the transverse member is conveniently interchangeable as a backrest or arm rest in a variety of different furniture configurations. Using this length X is substantially equal to the sum of the width Y of the base and the width Z of the transverse member configuration, a variety of furniture configurations can be formed from the base and transverse member, or from duplicates of those components, e.g., two bases 12 and four transverse members 14 to form a sofa, for example, or a variety of different furniture configurations, such as shown in U.S. Pat. No. 7,213,885 which is incorporated herein by reference, or other patents that are incorporated herein by reference.

The various components of furniture system 10, including bases 12 and transverse members 14, are selectively secured together via couplers 18, which are, in use, generally hidden from view as depicted in FIG. 1 but shown in the exploded view of furniture system 20 in FIG. 2. In addition, any of the various configurations of furniture systems 10 described herein, including chairs, ottomans, and beds, may include one or more bases 12 that are storage bases.

Thus, modular furniture system 10 has one or more couplers 18 for selectively coupling the base 12 to the transverse member 14, wherein the transverse member 14 can be coupled to the base 12 in multiple locations relative to the base 12 such that the transverse member 14 can be employed as a back rest or an arm rest within the modular furniture system 10. Transverse member 14 can be positioned in multiple locations in relation to the base 12 to thereby form different furniture assemblies. The transverse member 14 can be positioned in multiple locations in relation to the base 12 to thereby form different furniture assemblies, such that different furniture configurations can be formed and such that the transverse member 14 can selectively serve as either a backrest or an armrest.

Bases 12 of FIG. 1 are storage bases that receive thereon supporting cushions 16 for persons sitting or lounging thereon, while also providing additional functionality, including space to store items, such as blankets, books, electronics, or other items within the storage base. Visually, in at least one embodiment, storage bases are either indistinguishable from non-storage bases or can improve the aesthetic appearance of furniture systems.

Bases 12 of FIG. 1 FIG. 2 are storage bases that can be rearranged and reconfigured such that the storage space provided by such bases 12 can be repositioned without changing, repositioning, or otherwise reconfiguring the corresponding furniture system.

FIG. 2 illustrates an exploded view of an embodiment of a modular furniture system 20 in the form of an armchair, including a storage base 12 having a lid 22 and cushion 16 configured to be mounting thereon and further comprising a plurality of couplers 18 configured to selectively couple the various transverse members 14 to the storage base 12. Transverse members 14 and storage base 12 include slits 24 into which opposing arms of couplers 18 are inserted to secure storage base 12 to the various transverse members 14. Couplers 18 are removable such that storage base 12 and transverse members 14 can be separated, rearranged, and re-secured together as desired, as discussed above.

Storage base 12 of FIGS. 2-6B is comprised of a base frame 32 and a lid 22. Storage base lid 22 is shown in FIG. 2 in a partially cutaway view that illustrates the cover 52 of the lid 22 covering the body portion 26 (comprising e.g., webbing and springs) of the lid 22 and the outer rectangular frame 28 of the lid 22 to which the webbing and springs of the lid 22 are attached.

Lid 22 of FIG. 2 includes an internal body portion 26 spanning a rectangular lid frame 28. In at least one embodiment, body portion 26 includes materials or components configured to support cushion 16 placed thereon including the weight of persons or objects placed on top of cushion 16 during use. For example, in at least one embodiment, body portion 26 of lid 22 includes one or more S-springs and webbing spanning lid frame 28. In at least one embodiment, body portion 26 further includes fabric or other materials covering the frame, springs, and webbing, as illustrated in FIG. 2. In at least one embodiment, body portion 26 includes a wooden, plastic, or metal board or other material spanning lid frame 28.

In another embodiment, the body portion 26 can comprise a furniture spring system as disclosed in (i) U.S. Provisional Patent Application No. 62/806,516, filed on Feb. 15, 2019, entitled INTEGRATED MANUFACTURING FOR MODULAR FURNITURE, which is incorporated herein in its entirety by reference; and/or (ii) U.S. Patent Application entitled "Furniture Spring System", filed the same day as the present application, the entire disclosure of which is incorporated herein by this reference.

Lid 22 is configured to be removeable from the storage base frame 32 independently of the transverse members 14. For example, once furniture system 20 is assembled so that transverse members 14 are secured to storage base 12 via couplers 18, lid 22 can be selectively removed from storage base frame 32 to cover and provide access to a storage cavity 30 defined by the interior space of storage base 12. As illustrated in FIG. 2, the access to the storage cavity within storage base 12 can be achieved without removing any couplers 18 and without disconnecting any transverse member 14 from storage base 12. Likewise, lid 22 can be placed on top of storage base 12 without altering any other connections of the various furniture system components.

Thus, access to the storage cavity within storage base 12 of FIG. 2 can be achieved without removing the couplers 18 that couple the transverse members 14 to the base 12, and a lid 22 of storage base 12 can be placed onto the base frame 32 of the storage base 12 without altering the connection between the base 12 and the transverse member 14.

In the illustrated embodiment of FIG. 2, lid 22 and cushion 16 are two separate pieces that can be joined together, e.g., through corresponding attachments members (such as VELRCO attachment members, for example). Cushion 16 sits on top of lid 22 during use and can be freely separated from lid for removing or lifting lid to provide access to storage cavity 30. Attachment members, e.g., VELCRO attachment members, may be employed to selectively, removably mount the cushion 16 on lid 22, for example.

In one other embodiment, lid 22 and cushion 16 can be removably secured together or integrally formed with one another such that lifting cushion 16 also lifts lid 22 from storage base 12.

Lid 22 in FIG. 2 is configured to be placed on top of a storage base frame 32 and completely lifted off, as shown in the exploded view. In some embodiments, mounted on the base frame 32" can include positioning the lid 22 on an uppermost edge or surface of one or more walls of the storage base frame 32. In other embodiments, mounted on the base frame 32" can include configurations where the lid 22 is disposed on at least a portion of the one or more walls of the base frame 32. In some embodiments, lid 22 is not secured in any way to storage base frame 32. Rather, lid 22 rests on top of base frame 32 and can easily be lifted off. However, in at least one embodiment, lid 22 is partially or removably secured to storage base frame 32. For example, in at least one embodiment, lid 22 is removably secured to storage base frame 32 via one or more clips, clamps, hook and pile attachment members, or other attachment members along one or multiple edges of lid 22. In such an embodiment, lid 22 is removably secured to storage base frame 32 to prevent the lid 22 from inadvertently lifting, sliding off, or otherwise disengaging from storage base 12.

Also, for example, in at least one embodiment, lid 22 is secured to storage base frame 32 via one or more hinges along an edge of lid 22. In such an embodiment, lid 22 can be lifted from storage base frame 32 like opening a door. Also, for example, in at least one embodiment, lid 22 is secured to storage base frame 32 via one or more sliding mechanisms to enable lid 22 to slide on and off storage base 12. Other securement means, including removable securement means that secure lid 22 to storage base frame 32 are also contemplated which at least partially secure lid 22 to storage base frame 32 while still allowing selective access to storage cavity 30.

Figure 3B:
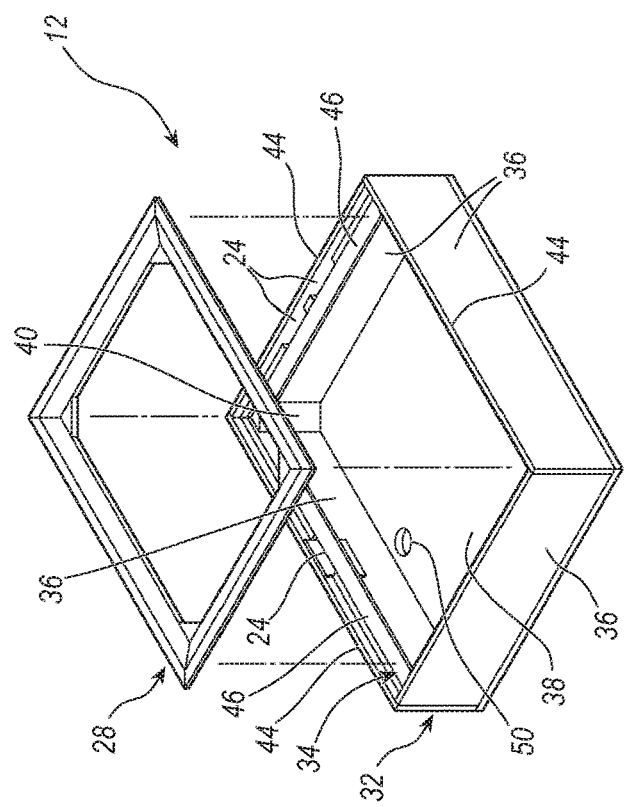
FIG. 3B illustrates a partially assembled embodiment of the storage base of FIG. 3A, wherein the chamfered edge has been secured within the base frame support structure to form the base frame and wherein the lid frame 28 of lid 22 is shown exploded above the base frame.
Figure 3A:
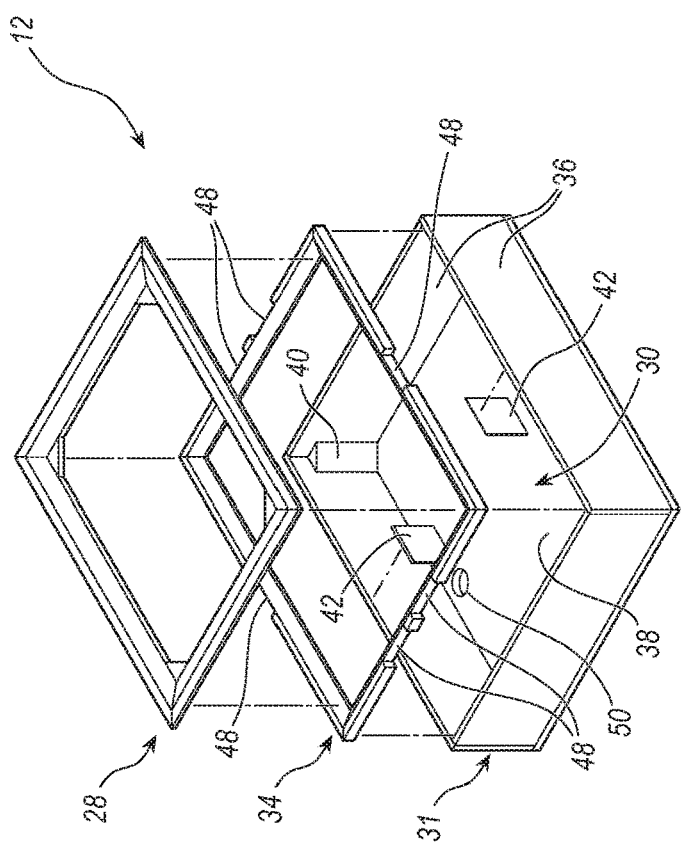
FIG. 3A illustrates an exploded view of an embodiment of a storage base of the present invention, the storage base including: (i) a base frame support structure; (ii) a chamfered edge configured to be mounted within the base frame support structure to form a base frame; and (iii) and a lid frame 28 of a lid 22; the lid cover and inner portion of the lid 22 (see FIG. 2) are not shown in FIGS. 3A-3C.

FIG. 3A illustrates an exploded view of storage 12, the storage base comprising: (i) a base frame support structure 31; (ii) a rectangular-shaped chamfered edge 34 configured to be mounted within the base frame support structure 31 to form a base frame 32 (as illustrated in FIG. 3B); and (iii) and a lid frame 28 of a lid 22. The lid cover 52 and body portion 26 of the lid 22 (see FIG. 2) are not shown in FIGS. 3A-3C.

Figure 3C:
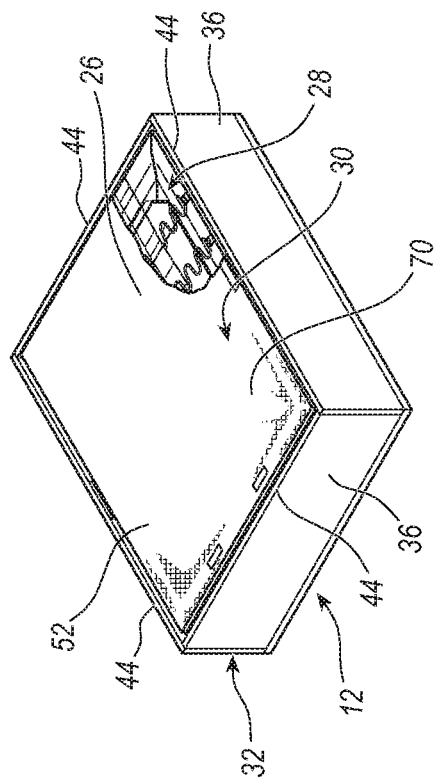
FIG. 3C illustrates the assembled storage base, including a base frame having a chamfered edge and further comprising a lid frame 28 of lid 22 mounted on the base frame.
Figure 3D:
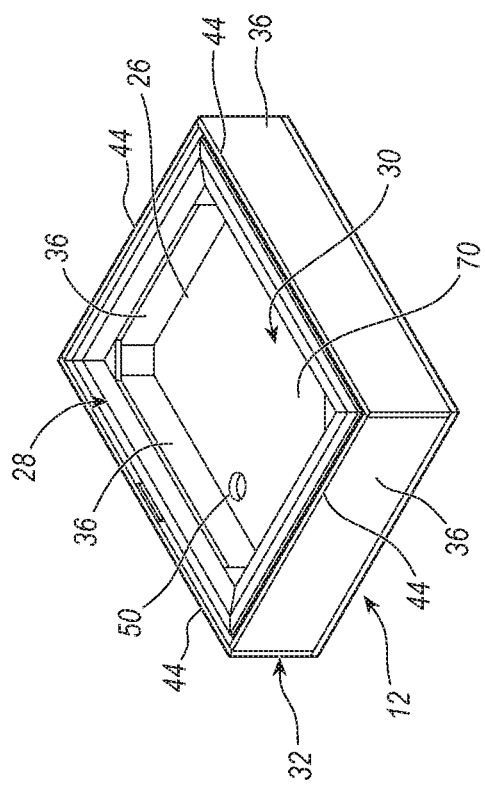
FIG. 3D illustrates a completed base comprising: (i) a base frame; and (iii) and a lid 22 mounted on the base frame with the lid cover and inner portion of the lid 22 (see also FIG. 2) shown in a cutaway view.

FIG. 3C illustrates assembled storage base 12, including a base frame 32 having a chamfered edge 34 and further comprising lid frame 28 of lid 22 mounted on base frame 32. FIG. 3D illustrates a completed base 12 comprising: (i) a base frame 32; and (iii) and a lid 22 mounted on the base frame with the lid cover 52 and body portion 26 of the lid 22 shown in a cutaway view.

As shown in FIGS. 3A-3D, base frame 32 includes a plurality of side panels 36 configured laterally or orthogonally across edges of a bottom panel 38 and extending upward therefrom. Side panels 36 and bottom panel 38 at least partially define storage cavity 30. Base frame 32 forms storage space 30 in a rectangular prism shape. In one or more other embodiments, base frame 32 can be formed to create storage spaces of various other shapes, including triangular, trapezoidal, or otherwise polygonal or irregularly shaped 3-dimensional prisms.

In one or more embodiments, base frame 32 can also include one or more structural support components 40, 42 secured to base frame 32 at one or more locations as shown in FIG. 3A. Structural support components 40, 42 add support and/or structural integrity to base frame 32 as needed. For example, in at least one embodiment, structural support components 42 are secured to inside surfaces of two side panels 36, as shown. Placing structural support components 42 as shown reinforces side panels 36 where coupler 18, shown in FIG. 2, is placed to couple a transverse member 14 to storage base 12 in one or more embodiments.

In addition, in at least one embodiment, base frame 32 can be molded as a single piece. In at least one embodiment, base frame 32 can be assembled using multiple molded pieces, such as side panels 36 and/or bottom panel 38 joined together. In at least one embodiment, base frame 32 can comprise a single molded piece.

As noted above, and shown in FIG. 3A, storage base 12 also includes chamfered edge 34. As shown in FIG. 3B, in at least one embodiment, chamfered edge 34 is disposed at or near an upper edge 44 of each side panel 36. In this way, chamfered edge 34 extends laterally inward from upper edges 44 of side panels 36 toward storage cavity 38. In at least one embodiment, chamfered edge 34 includes upper surface 46 that slants downward from upper edge 44 of side panels 36 toward bottom panel 38. In addition, as shown more clearly in FIG. 3A, in at least one embodiment, chamfered edge 34 includes recessed portions 48 at various positions around chamfered edge 34. Recessed portions 48 are recessed into the outer perimeter of chamfered edge 34 to form spaces between chamfered edge 34 and side panels 36 when chamfered edge is secured to side panels 36 as shown in FIG. 3B, to aid in providing coupling slits 24.

Again, as noted above, chamfered edge 34 can be integrally formed with base frame 32 or separately attached thereto. In either case, recessed portions 48 indicated in FIG. 3A form slits 24 indicated in FIG. 3B when chamfered edge 34 is formed with or secured to side panels 36 of base frame 32. Also, as noted above, slits 24 provide openings for arms of couplers 18 to be secured to hold transverse members 14 and bases 12 together, as shown in FIGS. 1 and 2. Along these lines, one or more other embodiments can include chamfered edges 34 having recessed portions 48 in other locations around the outer perimeter of chamfered edge 34, therefore providing slits 24 in various positions around base frame 32, other than those specifically shown in FIGS. 3A and 3B. These recessed portions 48 and resulting slits 24 can be formed in different positions as needed to accommodate couplers 18 and various configurations of furniture systems that include bases 12 and transverse members 14.

FIG. 3C illustrates a fully assembled view of an embodiment of a storage base 12, including a base frame 32 with a chamfered edge onto which lid frame 28 is disposed. As shown in FIG. 3D, lid 22 can include body portion 26 extending across lid frame 28 to form a closed lid assembly that supports weight from cushion 16 or persons sitting thereon. The body portion 26 illustrated in FIG. 3D, shows an example of a body portion 26 comprising S-springs and webbing, for example.

Lid frame 28 is mounted on chamfered edge 34 of base frame 32 within surrounding upper edges 44 of side panels 36. In this way, chamfered edge 34 supports lid frame 28, and thereby supports lid 22, cushion 16, and any other weight placed on top of storage base 12. In some embodiments, the chamfered edge 34 may be a support configured to be selectively mounted on the base frame 32.

FIGS. 3A-3C illustrate aperture 50 extending through bottom panel 38. In one or more other embodiments, aperture 50 can be any size or shape, and any number of apertures 50 can extend through bottom panel 38 in any position along bottom panel 38, so long as bottom panel 38 remains structurally sound enough to support items place thereon within storage cavity 30. In this way, the bottom panel 38 provides a substantially closed surface to the storage base, so that it can retain typical objects placed therein (e.g., blankets, toys, board games, books, speakers, other electronics, etc.).

Aperture 50 is advantageous for a number of reasons. First, aperture 50 provides access points through which cables and wires can pass to power electronic devices within storage cavity 30. For example, one or more speakers can be stored within storage cavity 30, with power and other connection cables accessing the speakers through aperture 50. In another embodiment, the storage cavity 30 provides a convenient place to store, e.g., satellite surround speakers when not in use. For example, they may be easily pulled from the storage cavity when it is desired to watch a movie (e.g., with 5.1 or 7.1 surround sound), placing the speakers behind the seating position, and replacing them in storage, out of sight, afterwards.

Second, aperture 50 provides ventilation for air to flow in and out of storage cavity 30. Such ventilation is important to cool electronic devices that can operate within storage cavity 30. Such ventilation can also be advantageous to keep air within storage cavity 30 fresh so that blankets, pillows, or any other items within storage cavity 30 remain fresh.

Third, aperture 50 provides an exit and entrance for air to escape or enter storage cavity 30 as the volume of storage cavity 30 changes due to the flexion of lid 22 when a person sits down on cushion 16 placed thereon. For example, in at least one embodiment described above, body portion 26 of lid 22 shown in FIG. 2 can comprise a flexible spring or fabric construction that bends downward into storage cavity 30 of storage base 12 during use. When this happens, the volume of storage cavity 30 decreases. Likewise, when the person stands up or an object is subsequently removed from cushion 16, body portion 26 of lid 22 resiliently rebounds and storage cavity 30 returns to its resting volume.

As the volume of storage cavity 30 increases and decreases during use in this way, aperture 50 allows air to advantageously enter and exit storage cavity 30 in response. In this way, comfort provided by a flexible body portion 26 of lid 22 is not negatively affected by trapped air within storage cavity 30. Also, in this way, body portion 26 is able to rebound easily and quickly when a person stands up or weight is otherwise removed from cushion 16 atop lid 22.

FIGS. 4A-4C illustrate an embodiment of a storage base 12 and two transverse members 14 coupled to base 12 via coupler 18. FIGS. 4A-4C illustrate lid 22 in various degrees of positioning, including lifted off storage base frame 32 completely in FIG. 4A, partially positioned on top of storage base frame 32 in FIG. 4B, and fully mounted on storage base frame 32 to form storage base 12 in FIG. 4C. As shown in FIG. 4A, and as noted above, storage base frame 32, including chamfered edge 34, provides slits 24 into which couplers 18 can extend to secure transverse members 14 to storage base frame 32.

Lid 22, which in at least one embodiment illustrated in FIGS. 4A-4C has a lid cover 52 mounted on the lid frame, includes one or more lower chamfered edges 54. In one embodiment all of the edges of lid 22 are chamfered to correspond to the chamfered edge 34 of base frame 32. The lid cover 52 can cover, conceal and contain the structure comprising the body portion 26 of lid 22, such as springs, slats, straps or other support structures. As seen in the partially seated configuration of FIG. 4B, lid 22 can be lowered onto storage base 12 so that lower chamfered edges 54 of lid 22 mate with and rest on upper surface 46 of chamfered edge 34 of base frame 32. Upper surface 46 of chamfered edge 34 extends downward and laterally into storage cavity 30 such that lid 22 can rest on top of storage cavity 30, near upper edges 44 of side panels 36, without interfering with slits 24 and the couplers 18 securing transverse members 14 to storage base 12.

In fact, in at least one embodiment, lid 22 can be selectively placed on storage base 12 and removed therefrom, as shown, after transverse members 14 and storage base 12 are secured together and without removing couplers 18 and separating transverse members 14 from storage base 12. Along these lines, couplers 18 can be removed and transverse members 14 separated from storage base 12 without removing lid 22 because lid 22 does not overlap or otherwise interfere with couplers 18 and slits 24.

Figure 5A:
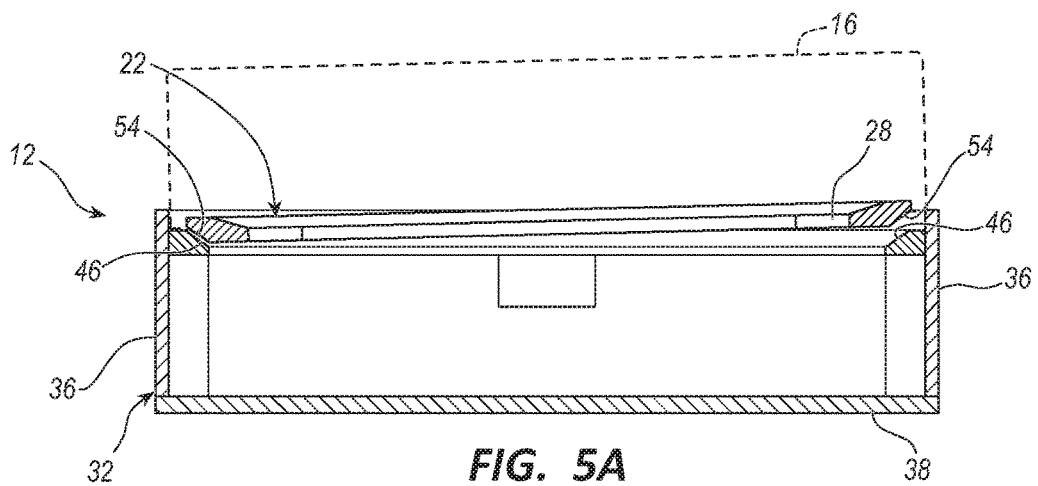
FIG. 5A illustrates a cross-sectional view of the storage base and lid (with the fabric lid cover removed) illustrated in FIGS. 4A-4C, shown in a skewed, un-settled configuration.
Figure 5B:
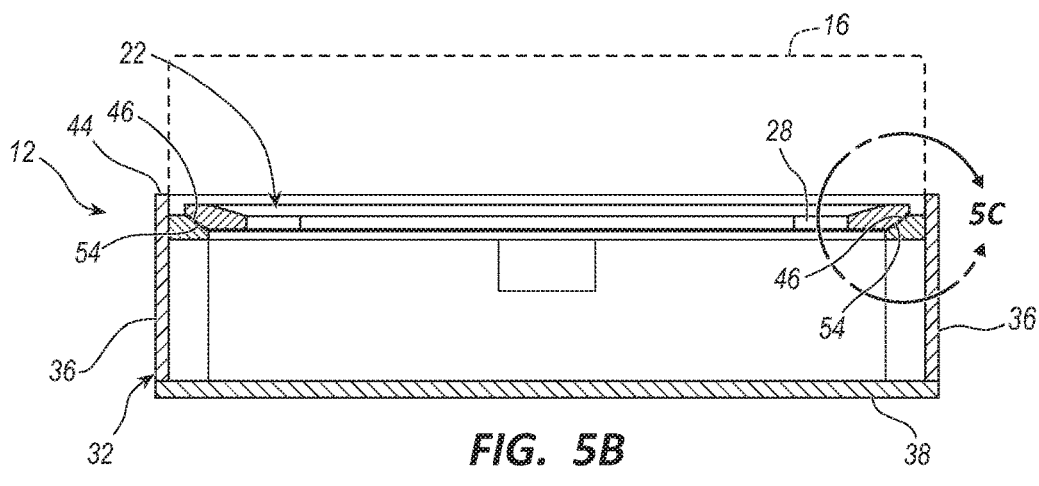
FIG. 5B illustrates a cross-sectional view of the storage base and lid illustrated in FIG. 5A, shown in a settled configuration, according to the present disclosure.

FIGS. 5A-5B illustrate a cross-sectional view of storage base 12, including storage lid 22 and storage base frame 32 which combine to form base 12. Base frame 32 that includes side panels 36 and bottom panel 38. Lid 22 is shown, in FIG. 5A in the process of being mounted on base frame 32 of storage base 12 such that lower chamfered edges 54 of lid 22 will contact and rest on upper surface 46 of chamfered edge 34 of base frame 32. Cushion 16 is also shown in dotted lines to indicate a possible position of cushion 16 on top of lid 22 and storage base 12 during use.

During use, a user may inadvertently place lid 22 onto base frame 32 off-center, at a skewed angle, or otherwise unevenly as shown in FIG. 5A. However, the angle of both lower chamfered edge 54 of lid 22 and upper surface 46 of chamfered edge 34 contact each other in a mating relationship so that, in some embodiments, gravity causes lower chamfered edge 54 of lid and chamfered edge 34 of base frame 32 to interact so as to settle lid 22 down onto base frame 32 evenly and centered on top of base frame 32. In at least one embodiment, the force of gravity and the angle of lower chamfered edge 54 of lid 22 and chamfered edge 34 of base frame 32, along with the friction therebetween and the weight of lid 22, enable lid 22 to self-settle once lid 22 is generally placed on base frame 32.

FIG. 5B illustrates lid 22 from FIG. 5A, after self-settling, such that lid 22 is flush with base frame 32. As shown, when lid 22 is placed on storage base frame 32, lower chamfered edges 54 of lid 22 are mounted on upper surfaces 46 of chamfered edge 34, such that chamfered edge 34 supports lid 22. Thus, in addition to the angle selected for lower chamfered edge 54 and upper surface 46 that enables self-settling of lid 22, the angle is also selected to enable sufficient structural strength of chamfered edge 54 to support lid 22 and any weight thereon, including weight of cushion 16 and any objects or persons placed thereon.

Figure 5C:
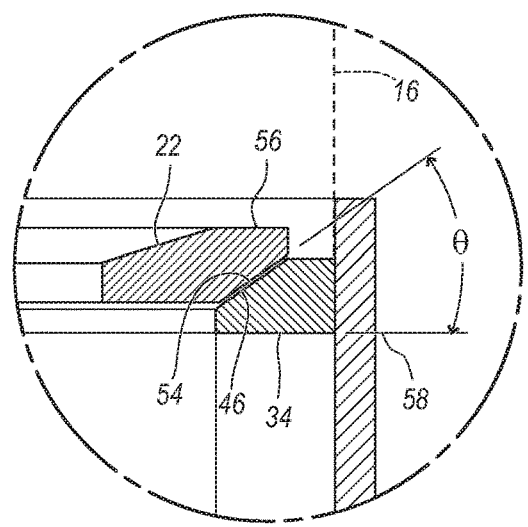
FIG. 5C illustrates a close-up view of a corner of the storage base and lid illustrated in FIGS. 5A-B, showing convenient nesting of the angled surfaces, according to the present disclosure.

FIG. 5C illustrates a close-up view of chamfered edge 54 of lid 22 and chamfered edge 34 of base frame 32 mating when fully seated, including lower chamfered edge 54 of lid 22 and upper surface 46 of chamfered edge 34 shown in mating relationship. FIG. 5C illustrates angle θ. Angle θ represents the degree at which lower chamfered edge 54 and upper surface 46 are disposed relative to a horizontal plane 58 in which lid 22 lies when properly seated. Angle θ is such that angle θ enables the self-settling features of lid 22 and the structural support features required of chamfered edge 34.

A balance is advantageously struck between these opposing features, such that angle θ is large enough to enable the self-settling features of lid 22 and small enough to provide necessary structural support of chamfered edge 34. That is, generally in some aspects, the higher angle θ is, the more efficient the self-settling of lid 22 will be such that friction between lower chamfered edge 54 and upper surface 46 is overcome by the weight of lid 22 based on the large incline of angle θ. On the other hand, generally, in some aspects, the lower angle θ is, the more chamfered edge 34 extends underneath lid 22 to provide greater contact surface area between the mating surfaces, providing improved weight bearing structural support thereto.

In order to accomplish this balance, in at least one embodiment, angle θ may be between about 10 and 60 degrees. In one implementation, angle θ may be between about 20 and 50 degrees. In yet another implementation, angle θ may be between about 30 and 40 degrees or about 35 degrees. By way of example, the contact length between these mating surfaces 54 (of lid 22) and 46 (of base frame 32) as shown in FIG. 5C may range from about 0.25 to 8 inches, from about 0.5 to about 4 inches, or from about 1 to about 3 inches, for example.

To further illustrate the self-settling features of lid 22, FIGS. 6A and 6B illustrate a top view of lid 22 (shown without cover 52 or body portion 26) self-settling on base frame 32 when initially placed on base frame 32 at a skewed angle. For example, as shown in FIG. 6A, lid 22 can be placed on base frame 32 at a skewed angle or non-concentrically with base frame 32. However, due to the self-settling features described above, once the lid is placed onto the base frame during use, even if at a skewed angle as shown in FIG. 6A, mating chamfered lid 22 can passively settle such that lid 22 becomes concentric with base frame 32, without extra effort from the user to center or otherwise adjust lid 22 onto base frame 32, as shown in FIG. 6B. Thus, as illustrated in FIGS. 6A-B, in certain embodiments, lid 22 selectively nests onto the base frame 32 and the chamfered portions of the lid 22 self-settle via gravity onto the chamfered portions of the base frame 32 when the lid is placed onto the base frame during use.

As shown in FIG. 5B, once lid 22 self-settles onto base frame 32, upper surface 56 of lid 22, in at least one embodiment, sits below upper edge 44 of side panels 36 of base frame 32. Chamfered edge 34 provides a recessed structure within base frame 32 that allows lid 22 to self-settle down below upper edges 44 of base frame 32. Thus, the corresponding angles of the base frame 32 and lid 22 help the lid position itself and nest into the base frame during use.

Advantageously, lid 22 can be hidden from view when cushion 16 is placed thereon. Hiding lid 22 from view can provide a more aesthetically pleasing look for furniture systems utilizing storage bases 12 because functional storage features, such as lid 22, are hidden from view during use.

The bottom panel 38 can be thicker than the side panels. For example, the bottom panel can be made sufficiently thick and strong to avoid breakage where a user stands thereon. In an embodiment, the thickness of side panels 36 of base 12, of any of the embodiments shown herein, ranges from 0.25 to 2 inches, and the thickness of the bottom panel 38 of base 12, of any of the embodiments shown herein, ranges from 0.25 to 2.5 inches, or from 0.5 inch to 2.5 inches.

As illustrated in FIGS. 2, 4A-4C, and 6A-6B, access to the storage cavity within the storage base 12 can be achieved without removing the coupler(s) 24 that couple the transverse member(s) 14 to the base 12; and the lid 22 (or other suspension system) can be placed onto a base frame 32 of the storage base 12 without altering the connection(s) between the base 12 and the transverse member(s) 14.

Figure 7B:
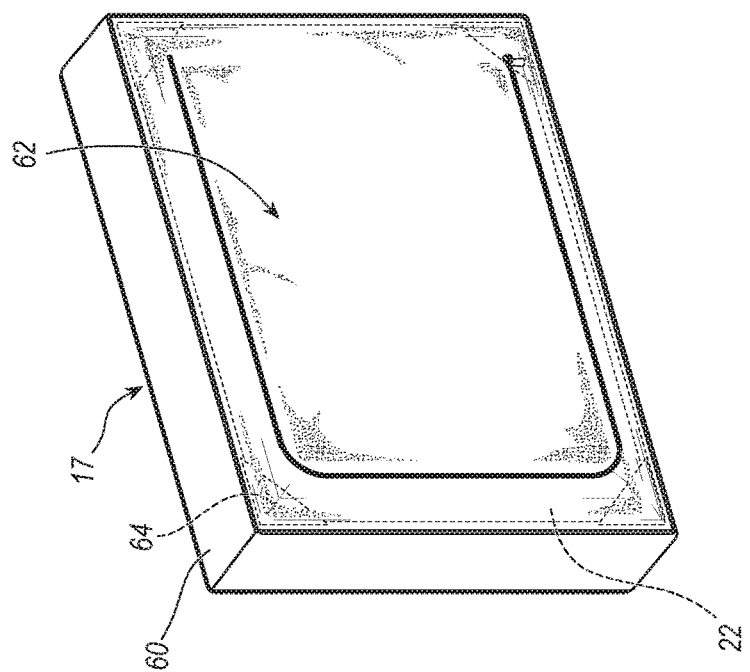
FIG. 7B illustrates an embodiment of the cover of FIG. 7A with the cover securing a cushion and the storage lid of FIG. 7A therein to form an integrated cushion-lid assembly, according to the present disclosure.
Figure 7A:
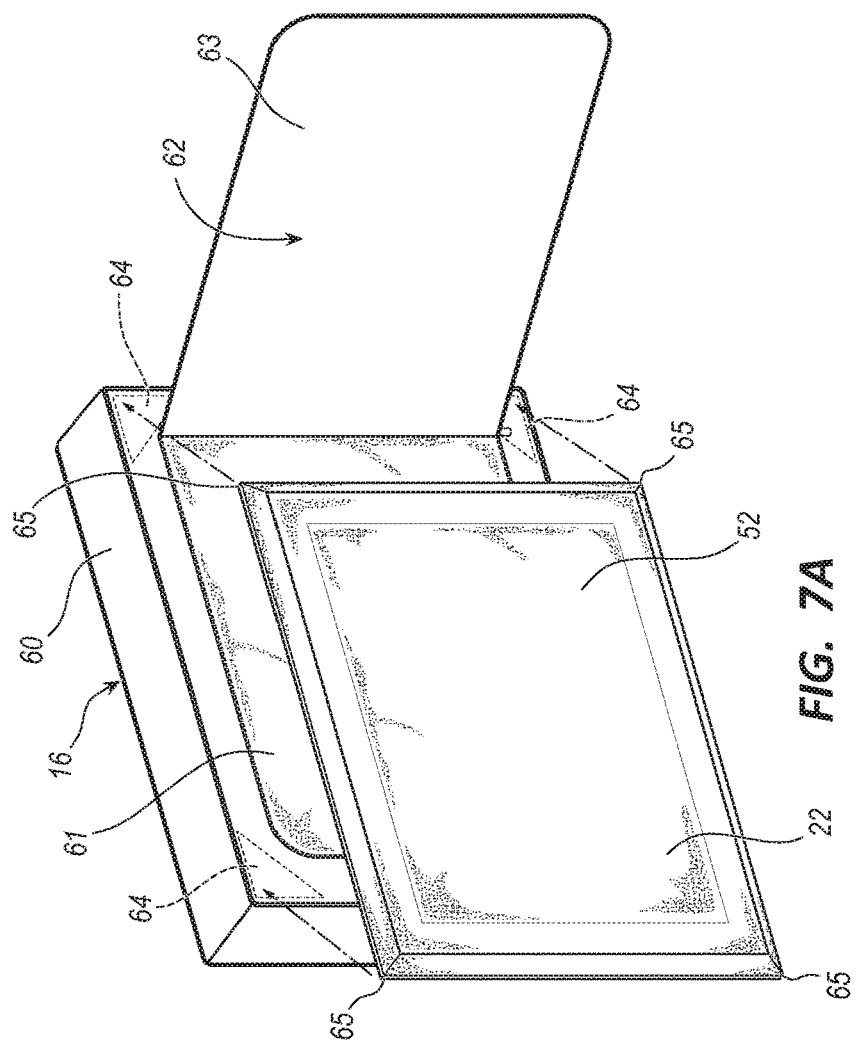
FIG. 7A illustrates an embodiment of a cushion cover containing a cushion member and configured to receive a lid in the cover, including pockets (shown in broken phantom lines) to secure the lid within the cover, according to the present disclosure.

FIG. 7A illustrates an exploded view of an embodiment of a cushion 16 configured to receive lid 22 in a cover 60 covering a cushion member 61, thus forming an integrated cushion-lid seating assembly 17 shown in the assembled view of FIG. 7B. The integrated lid-cushion seating assembly 17 can comprise a cushion cover 60 configured to selectively receive (i) a cushion member 61 (e.g., a foam, filler, or feather-based cushion member 61), and (ii) a lid 22, to form a seating assembly, as shown in FIG. 7B. The lid 22 of FIGS. 7A and 7B is shown with a cover 52 (e.g., fabric), covering the body portion 26 of the lid 22. Cover 60 includes selectively opening flap 62 disposed on a lower portion of cover 60. In at least one embodiment, cover 60 also includes interior corner pockets 64. In the illustrated embodiment, interior corner pockets 64 are formed as right triangles, with the hypotenuses thereof open to receive corners 65 of lid 22 to thereby more readily retain lid 22 therein.

Lower flap 62 can be selectively opened to expose an inside surface 63 thereof, and lid 22 can be inserted within cover 60 such that corners 65 of lid 22 are received into interior corner pockets 64 of cover 60. Lower flap 62 can then be closed, as seen in FIG. 7B, such that lid 22 is disposed within cover 60. Specifically, in at least one embodiment, lid 22 is disposed within cover 60 between the lower flap 62 and cushion member 61. In this way, cover 60 secures lid 22 adjacent cushion 16 to form an integrated cushion-lid seating assembly 17.

Figure 8B:
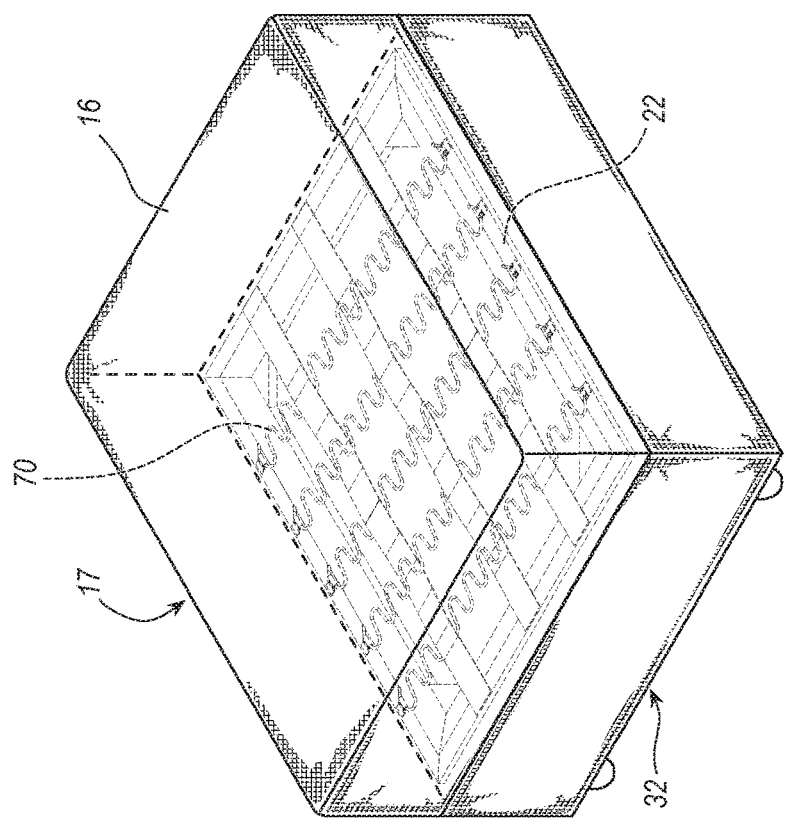
FIG. 8B illustrates an embodiment of the integrated cushion-lid assembly of FIG. 8A mounted on the storage base of FIG. 8A for receiving a user thereon in a sitting position.
Figure 8A:
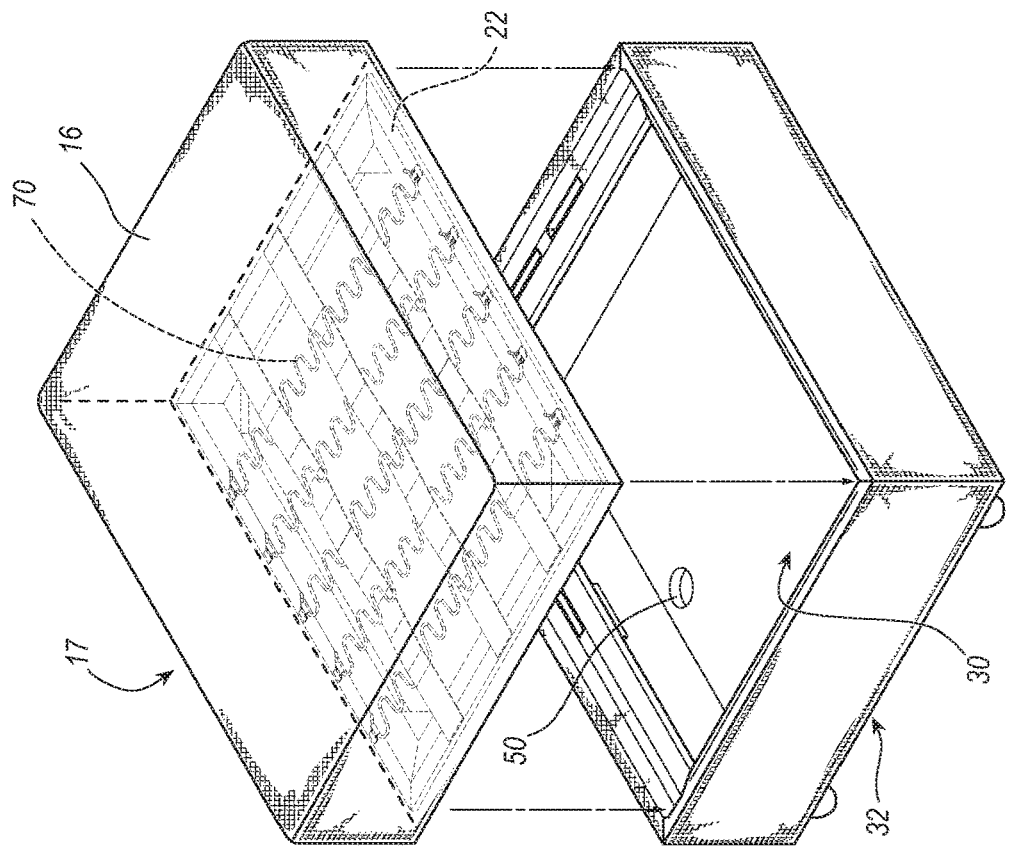
FIG. 8A illustrates an embodiment of a storage base frame with an integrated cushion-lid assembly above the storage base frame in an open, exploded configuration.

Embodiments of integrated cushion-lid seating assemblies described herein are advantageous for a number of reasons, as illustrated in FIGS. 8A-B. For example, integrated cushion-lid seating assemblies reduce the number of separate parts of a storage base system as described herein. For example, as shown in FIG. 8A, integrated cushion-lid assembly 17 can serve as both a cushion on which to sit and/or lie, as well as a lid assembly for selectively opening or closing storage base 12. As shown in FIGS. 8A-B, user simply lifts cushion-lid assembly 17, which includes both cushion 16 and lid 22 mounted within the cover 60 of cushion 16, to gain access to storage cavity 30 within storage base 12 without having to lift multiple separate pieces.

In addition, cushion-lid seating assemblies provide improved aesthetic features to a furniture system utilizing storage bases described herein. For example, as seen in FIG. 8B, which illustrates an embodiment of an integrated cushion-lid seating assembly 17 placed on a storage base 12, lid 22, which is generally more rigid than cushion 16, holds lower corners 66 of cushion 16 down when placed on storage base 12. This is especially advantageous when a user sits or lies on cushion 16. Without lid 22 secured to cushion 16 within cushion-lid assembly 17, lower corners 66 of cushion 16 would generally flex upward in response to weight bearing down on top of cushion 16, due to the soft, flexible construction of cushions generally known in the art.

Upward flexing lower corners 66 form gaps between cushions and furniture bases on which they are placed, which can be unsightly, and can even expose springs or other unsightly furniture components below the cushions. However, lid 22 of cushion-lid assembly 17 shown in FIG. 8B holds lower corners 66 of cushion 16 down so that even when users sit on top of cushion 16, lid 22 holds lower corners 66 down flush with storage base 12, thus eliminating any unsightly gaps therebetween.

In some embodiments, the furniture assembly can include interchangeable furniture covers which can allow a user to customize the color and/or type of material covering the furniture. The interchangeable furniture covers can include a lid cover 52 configured to be applied to a lid 22, and/or a base frame cover 88 configured to be applied to a storage base 12.

Springs 70 of lid 22 are shown in FIGS. 8A and 8B wherein lid 22 is mounted within cover 60 below the cushion member 61.

Figure 7C:
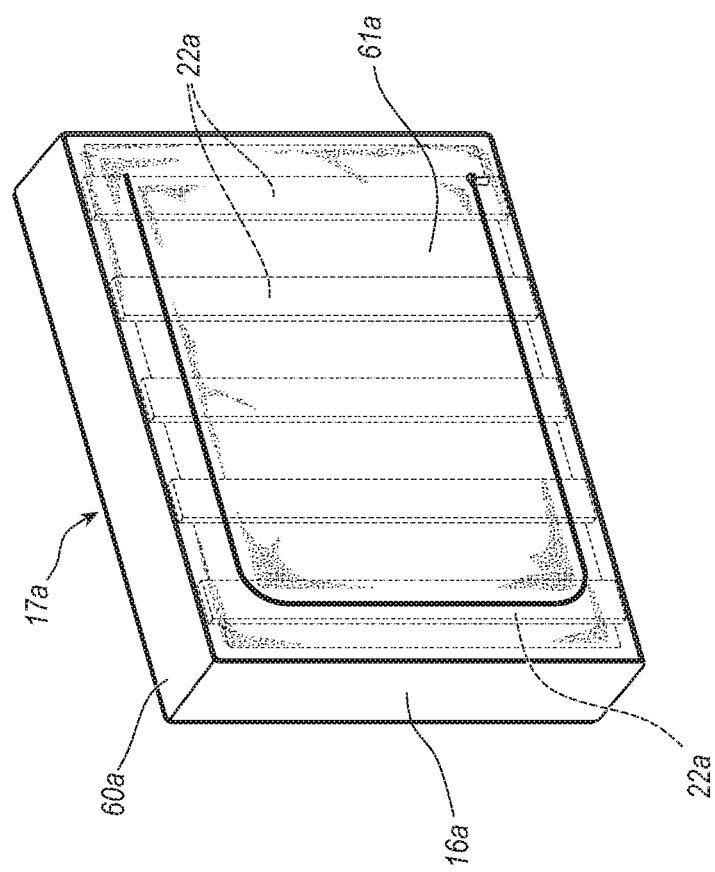
FIG. 7C illustrates an alternate suspension system in the form of a plurality of slats mounted within a cushion cover to form an integrated cushion-suspension system seating assembly using slats as support members; optionally, the plurality of slats can be mounted onto a base frame to receive the cushion thereon and support a user, in similar fashion to the lid described with respect to FIGS. 7A-7B.

Lid 22 is one example of a suspension system of the present invention that supports a user and/or receives a cushion thereon. In yet another embodiment, the suspension system that supports a user and/or receives a cushion thereon may comprise one or more slats 22a or other structures that are selectively mounted onto a base frame 32 to support a cushion thereon, for seating by a user, or are selectively mounted within a cover 60a of a cushion 16a, as illustrated in FIG. 7C, to form an integrated cushion-suspension system seating assembly 17a that is selectively mounted onto a base frame 32 in order to provide support for a user when the seating assembly 17A is mounted onto a base frame 32. In FIG. 7C, the slats 22a of such an assembly 17a are shown within the cover 60a, which selectively mounts onto the base frame 32 in a similar way to that of integrated cushion-lid seating assembly 17 shown in FIGS. 8A-B.

Thus, lid 22 of FIGS. 2-7B can be replaced with slats 22a of FIG. 7C or other support members to act as a suspension system that can selectively mount onto base frame 32 with a cushion thereon for supporting the user, or can selectively mount within cover 60a of the cushion 16a, as shown in FIG. 7C to form an integrated cushion-suspension seating assembly 17A that can be selectively mounted on base frame 32.

In one such embodiment, a modular furniture system of the present invention comprises a transverse member 14 and a base frame member 32 (e.g., the base member comprising a base frame as shown in FIG. 2 or 8A) having a bottom panel and side panels, wherein the base frame is open at a top thereof, providing an accessible storage cavity beneath a seating surface and a storage cavity at least partially defined by the bottom panel and the side panels. The suspension system in the form of a lid 22 or one or more slats 22a or other structures is configured to be selectively mounted on the base frame 32 to support a user. A cushion can be mounted on the suspension system (e.g., the lid 22 or slats 22a), thereby providing a seating assembly, such as or similar to that illustrated in FIG. 2 or 5A-B. In such an embodiment, the suspension system (e.g., lid 22 or slats 22a) is configured for providing support to a user sitting on the base. The lid 22 or slats 22a of the suspension system can optionally, selectively fit into a cover, such as cover 60 or 60a of the cushion, thereby forming an integrated cushion-suspension system seating assembly that is selectively mounted on a base frame 32.

Thus, cushion covers 60 and 60a are configured to selectively receive a cushion and a variety of different suspension systems therein (e.g., a lid or slats 22a), each forming a different type of integrated cushion-suspension system seating assembly. The seating assemblies shown in FIG. 7B or 7C, for example, are selectively mountable onto the base frame 32, wherein each seating assembly is conveniently and selectively mountable onto the base frame 32 and are selectively removeable from the base frame 32 as an integrated seating assembly.

Slats 22a can be of a variety different shapes and materials, e.g., elongate rectangularly shaped wooden bed slats, various wood slats, plastic, metal, adjustable slats, and a variety of different types of elongate slat members, such as described in U.S. Provisional Patent Application No. 62/806,516, filed on Feb. 15, 2019, entitled INTEGRATED MANUFACTURING FOR MODULAR FURNITURE, for example, which is incorporated herein in its entirety by reference In yet another embodiment, the suspension system, e.g., slats 22a, are integrated, such as through molding for example, into the cushion member 61a illustrated in FIG. 7C to form a single-piece integrated seating assembly that is selectively mounted onto a base frame 32. Thus, slats 22a and cushion member 61a can be integrally formed as a single piece, another example of an integrated cushion-suspension seating assembly in the form of a single molded member. The resulting single molded member cushion-suspension seating assembly can be selectively mounted onto base frame 32 as a seating assembly for a user. The cushion of the single-piece integrated cushion-suspension system seating assembly may be comprised of a foam material, for example, while the slats may be comprised of the same foam material formed in a different density or hardness. Optionally, different materials may be integrally-molded to form a single-piece integrated cushion-suspension system seating assembly.

Figure 9:
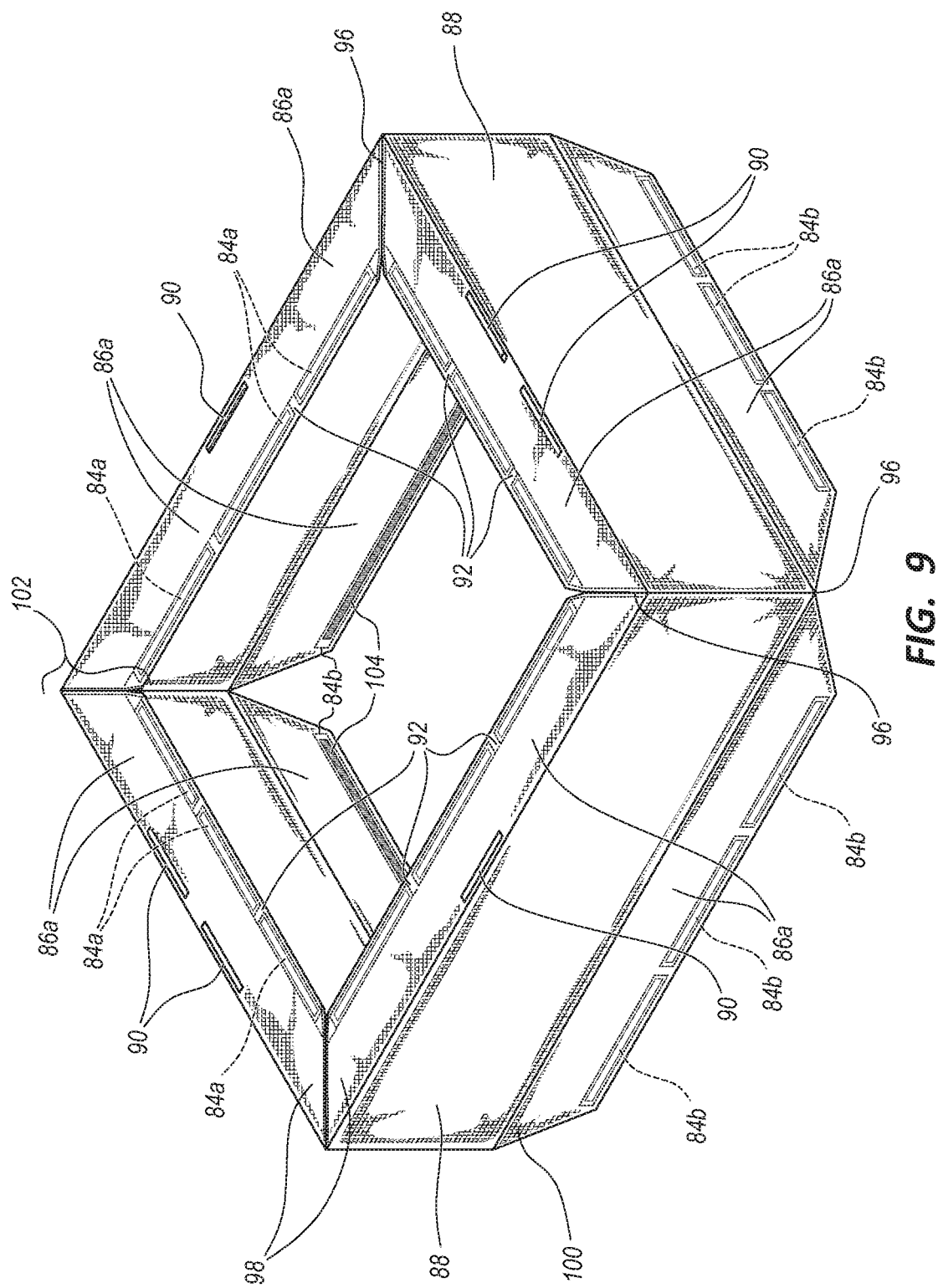
FIG. 9 illustrates an embodiment of a base frame cover, not yet attached over a base frame.

FIG. 9 illustrates an embodiment of a base frame cover 88, not yet attached over a base frame 32. FIG. 9 illustrates a base frame cover 88 expanded to its full size, before being applied to a storage base frame 32. The base frame cover 88 can have a tube-shape having an open top end and open bottom end for receiving a storage base frame 32. The base frame cover 88 can be configured to form corners 96 so that the base frame cover 88 fits flush on the storage base frame 32. The base frame cover 88 can include a plurality of flaps 86a formed on the upper section 98 and the lower section 100 of the base frame cover 88. The flaps 86a can have a tapered shape so that when the flaps 86a are selectively attached to the storage base 12, they form corners 102, allowing them to wrap securely on to the storage base frame 32 without leaving any hanging or overlapping material. The plurality of flaps 86a on the upper section 98 can include at least one or more coupler apertures 90 that align with slits 24 on base frame 32 to allow couplers 18 to selectively couple a storage base 12 to a transverse member 14 after a base frame cover 88 has been applied to a storage base frame 32.

As shown in FIGS. 9-14, another aspect of the modular furniture assembly of the present invention includes spaced apart grasping strips (e.g., rigid or semi-rigid strips) inlaid within the flaps of the covers to assist the user in grasping the flaps, by providing structure and/or thickness to the ends of the flaps for grasping the flap edges, and for moving the flaps of the covers to a desired location on the base or lid to thereby tightly cover the base or lid.

The base frame cover 88 and/or lid cover 52 of the present invention may thus employ one or more furniture cover supports in the form of a rigid or semi rigid elongate grasping strips having a first end and a second end, and an elongate length extending along a longitudinal axis disposed between a first and second end, wherein the elongate gripping strip is associated with a furniture cover.

Figure 13:
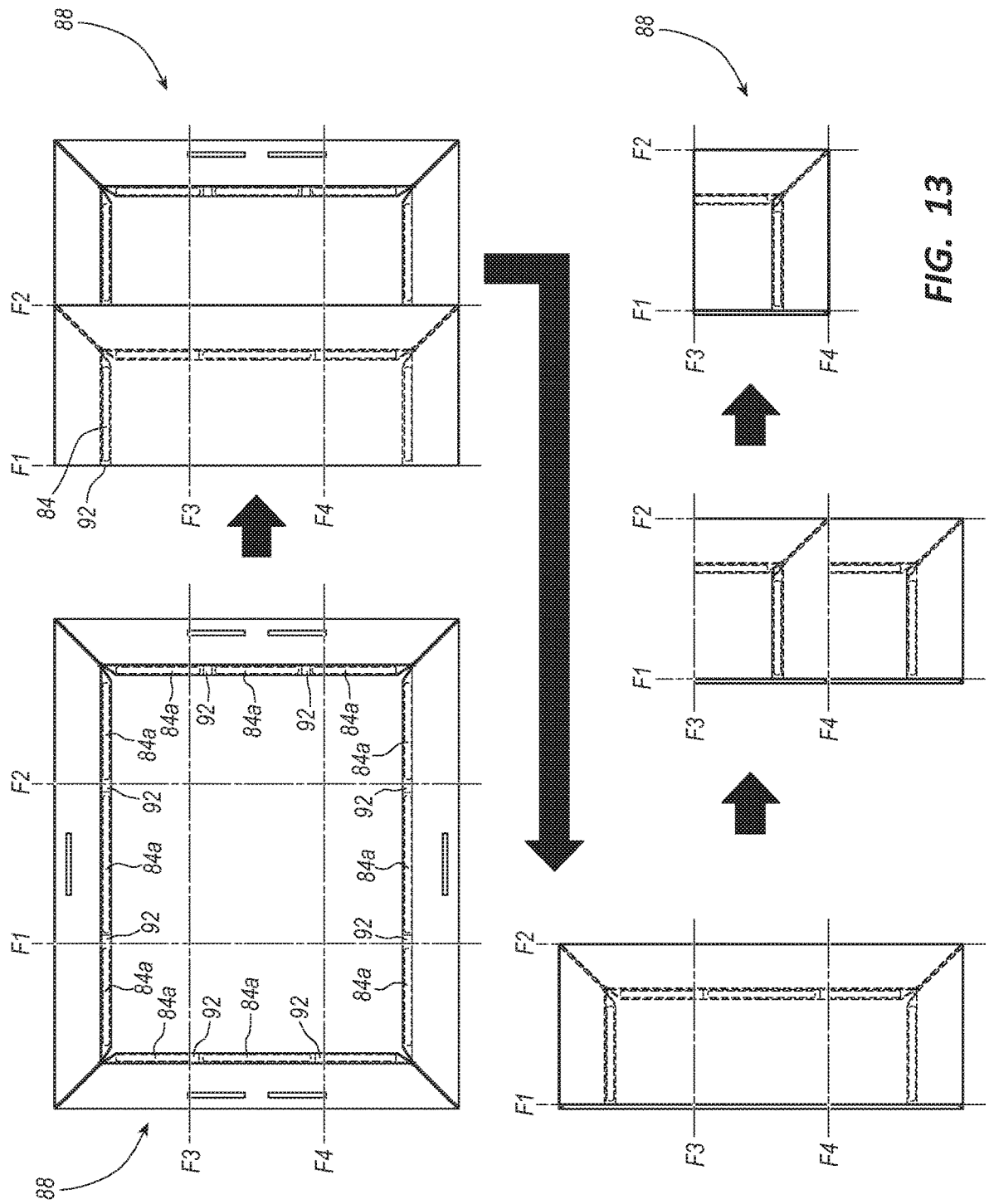
FIG. 13 illustrates a method of folding base frame furniture covers, illustrating that the spaces between the grasping strips of the present invention enable convenient folding of the covers.
Figure 14:
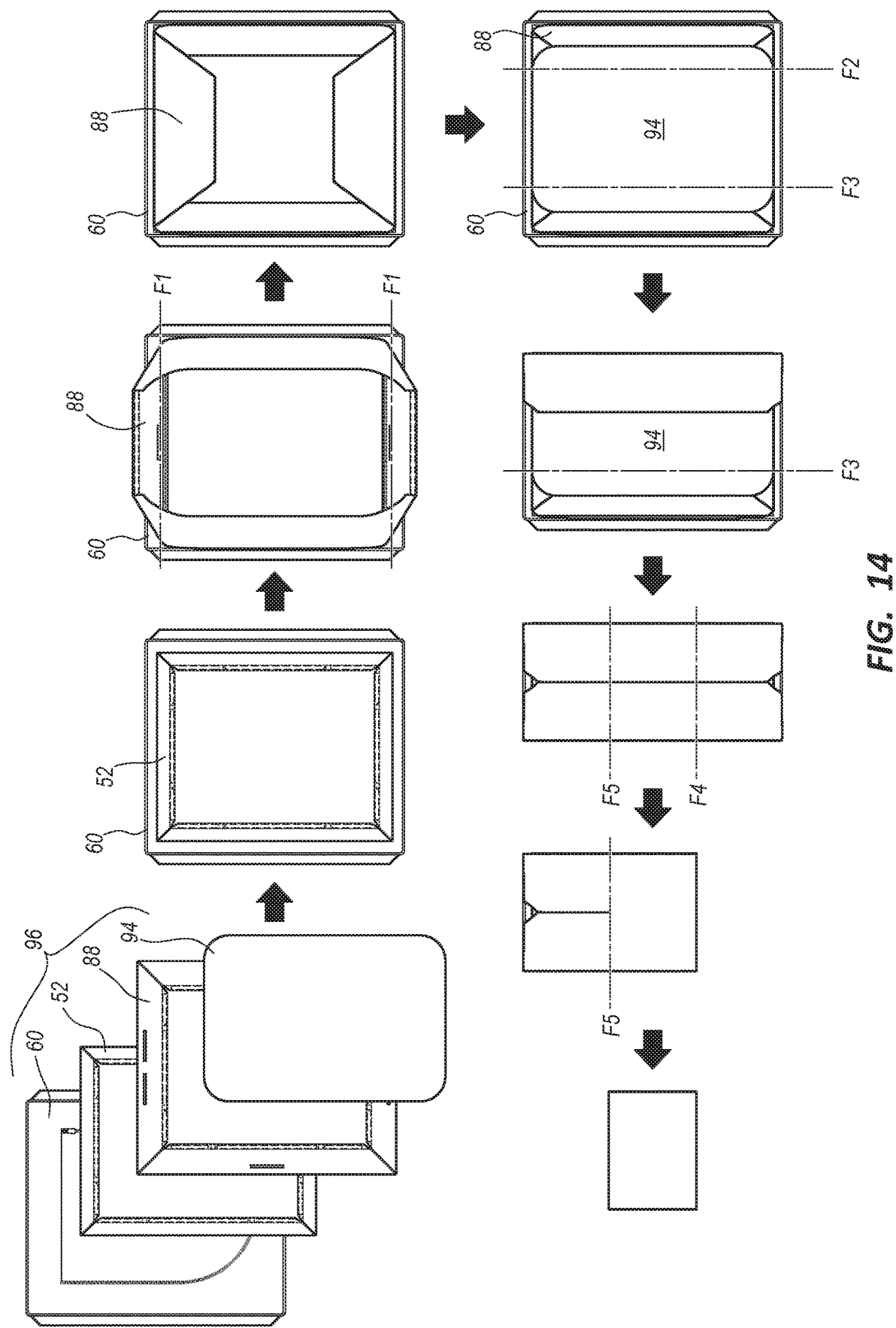
FIG. 14 illustrates a method of folding various covers of the present invention, further illustrating that the spaces between the grasping strips of the present invention enable convenient folding of the covers.

For example, as shown in FIG. 9, the tapered end of the flaps 86a can include one or more grasping strips 84a, 84b (e.g., elongate plastic members, tabs, or ribbons) inlaid within the material comprising the flaps 86a to increase the structure and/or thickness at the ends of the flaps for improved grasping while stretching the cover to a desired fit and location. In one embodiment, the grasping strips 84a-b can be inlaid by being sewn into the tapered end of the flaps 86a, while in another embodiment the grasping strips can be fixed by adhesive, buttons, or otherwise associated with the flaps. It can be advantageous to sew the strips 84 into the flaps 86a so that the strips 84 do not twist or move out of place during use. By way of example, the strips can be made of a rigid material or a semi-rigid, e.g., a plastic material that is flexible and resilient, so that it returns to its original shape after being flexed. The strips 84 can possess torsional stiffness across their width, and be flexibly resilient along the length. The inlaid grasping strips 84 can have at least one space 92 between each strip 84 for using in folding the covers, as illustrated in FIGS. 13-14.

The inlaid strips 84 can advantageously allow for a neat and simplified attachment by enabling a user to grasp the flap containing the strip(s) and, while grasping the inlaid grasping strip(s) stretch the flaps tightly to an adjacent surface, thereby keeping cover material from bunching or hanging when the end of the flaps 86a containing the strips 84 are folded around an edge of the storage base 12 and selectively attached via corresponding attachment members (e.g., VELCRO) to the storage base 12. The strips 84a can be sewn into or fixed within the material comprising the base frame cover, while the material on the inner side of the cover 88 adjacent the strips 84a includes an attachment member. The attachment member can be a member of a two-part fastening system, such as portions of hook and loop fasteners (e.g., VELCRO), buttons, clips, pins, magnets or the like, for example. The storage base frame 32 has mating attachment members (e.g., corresponding VELCRO attachment members) on the surface thereof to selectively attach the material on the inner side of the cover 88 adjacent to grasping strips 84b to the storage base frame 32.

FIG. 9, for example, shows attachment members 104 on the inner surfaces of lower flaps of cover 88. Attachment members 104 may each be a member of a two-part attachment system, such as hook and pile, e.g., VELCRO, for example. Attachment members 104 selectively attach to corresponding attachment members (e.g., corresponding VELCRO portions) on the lower surface of base frame 32 when a user grasps grasping strips 84b (mounted within the flaps) adjacent attachment members 104 and stretches the flaps onto the base frame 32 such that the attachment members 104 attach to corresponding attachment members on the base frame 32.

Figure 10:
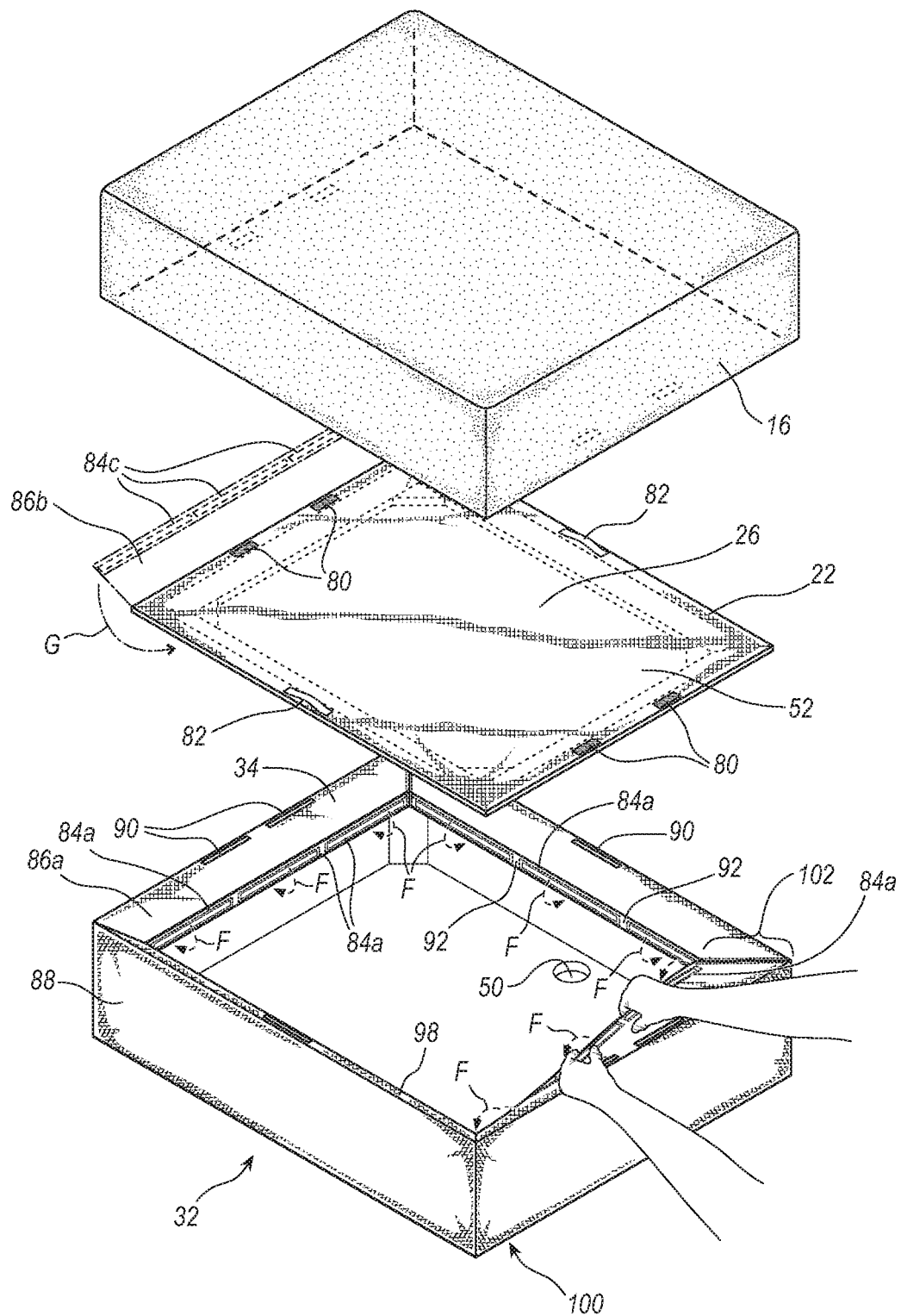
FIG. 10 illustrates an exploded view of an embodiment of a cushion, a lid, and a storage base frame with a base frame cover being attached onto the base frame.
Figure 11:
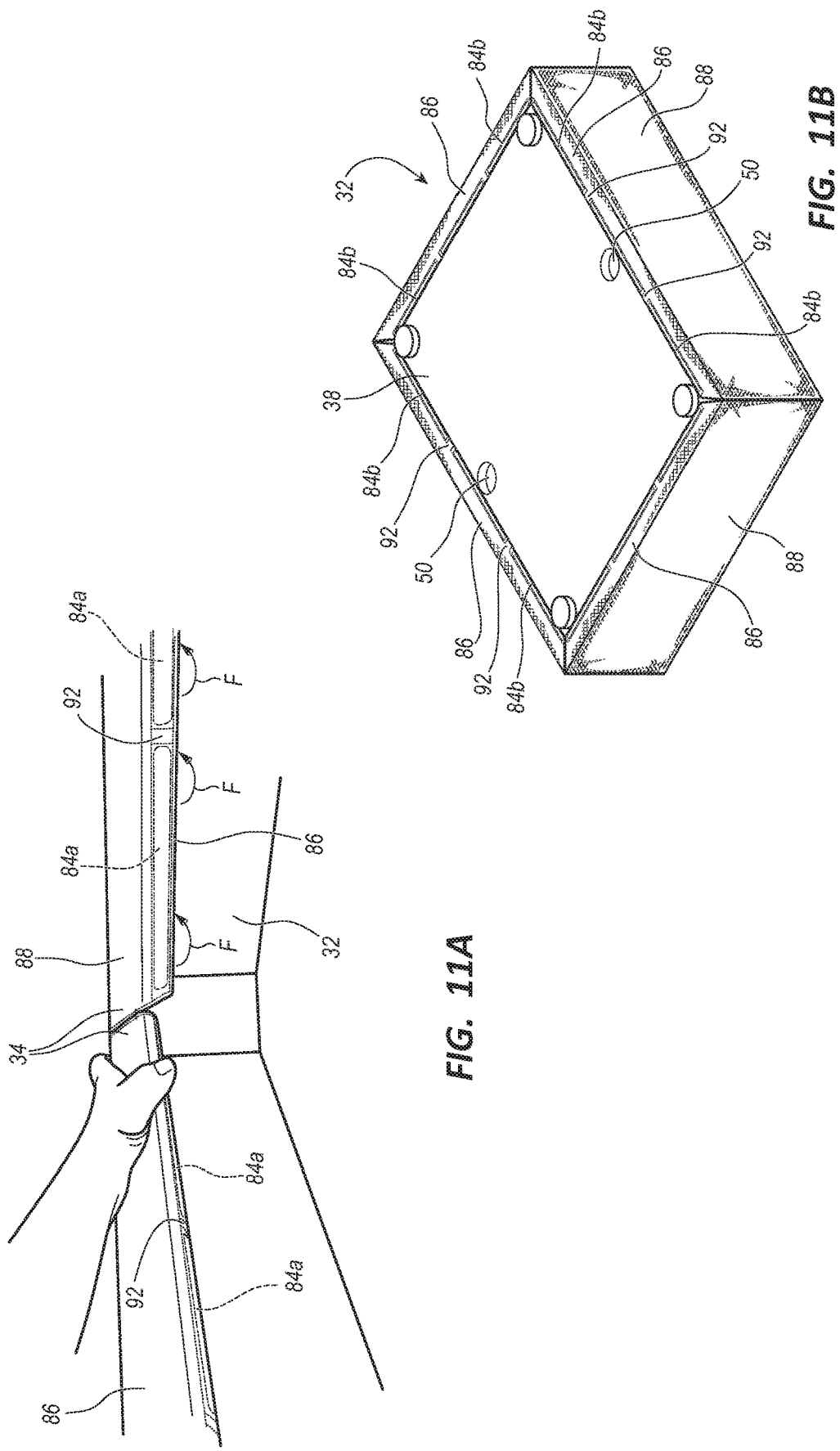
FIG. 11A is a close-up view of a base frame cover being attached over a base frame.
FIG. 11B illustrates a bottom perspective view of an embodiment of a storage base frame with a base frame cover attached thereon, according to the present disclosure.

FIG. 10 illustrates an example of a base frame cover 88, having grasping strips 84a, being selectively attached to a storage base frame 32. The upper section 98 of cover 88 covers that portion of the storage base frame 32 comprising the chamfered edge 34 where lid 22 nests with edge 34. It is useful for this location to avoid bunching or hanging of material because the lid 22 seats on the chamfered edge 34.

The flaps 86a of the base frame cover 88 can be conveniently folded and stretched using grasping strips 84a to securely wrap the flaps 86a around the chamfered edge 34 in direction F. The grasping strips 84 are used to conveniently fold and position the flaps to the inside of the storage base frame 32 and selectively attach the attachment members on the inside of the cover 88 adjacent the grasping strips 84a to corresponding attachment members positioned on the inside surface of base frame 32.

In some embodiments, the attachment members on the base frame 32 that attach to the inside of cover 88 are located on an underside of the chamfered edge 34 so that the attachment members cannot be seen from a top plan view. In another embodiment, the attachment members can be located on a top surface of a chamfered edge 34, which can be visible in a top plan view of the storage base 12. Alternatively, the attachment members can be located on an interior side of a wall of the storage base frame 32.

A cover 26 of lid 22 having grasping strips 84c for grasping while stretching cover 52 of lid 22 into place on the lid frame is also shown in FIG. 10.

As further shown in FIG. 10, the lid 22 includes a lid cover 52. The lid cover 52 can be applied to an upper surface of the lid 22 and cover or conceal the lid frame 28 and the body portion 26. The lid cover 52 can include flaps 86b having a tapered shape, which can taper away from the center of the lid cover 52 when the flaps 86b are open or unsecured as shown in FIG. 10. The flaps 86b can also include at least one or more grasping strips 84c inlaid within the flaps 86b. The strips 84c can be fixed within the flaps 86b by sewing, glue, pins, or the like. It can be advantageous to sew the strips 84c into the flaps 86b so that the strips 84c do not twist or move out of place during use. The underside of the lid cover 52 can be the side of the lid cover 52 which comes into direct contact with the surface of the lid 22 and thus has attachment members similar to attachment members 104, such as hook and loop fasteners, buttons, magnets or the like, which can selectively mate with attachment members disposed on the lid frame 28. The flaps 86b selectively wrap around the lid 22 in direction G to be selectively attached to a bottom side of the lid frame 28.

The top of the lid cover 52 can include one or more handles 82 to allow a user to easily remove the lid from the storage base 12. In some embodiments, the top surface of the lid cover 52 can include friction-causing elements or attachment elements 80, such as hook and loop fasteners (e.g., VELCRO), to removably secure a cushion 16 (or cushion cover) to the top of the lid 22 to prevent the cushion from moving or sliding during use of the furniture. In some embodiments, the entire top surface of the lid cover 52 may comprise friction-causing or attachment material.

FIG. 11A provides a view of flaps 86 of a base frame cover 88 being selectively attached to an underside of a chamfered edge 34 of a storage base frame 32. FIG. 11B illustrates a bottom perspective view of a storage base frame 32 with a base frame cover 88 selectively attached to an exterior-facing side of the bottom panel 38. The exterior surface of the bottom panel 38 can include one or more attachment members (e.g., VELCRO members) providing for the selective attachment of the flaps 86 to the storage base 12. The flaps 86 configured to attach to the exterior of the bottom panel 38 can also include strips 84*b* separated by spaces 92.

Figure 12:
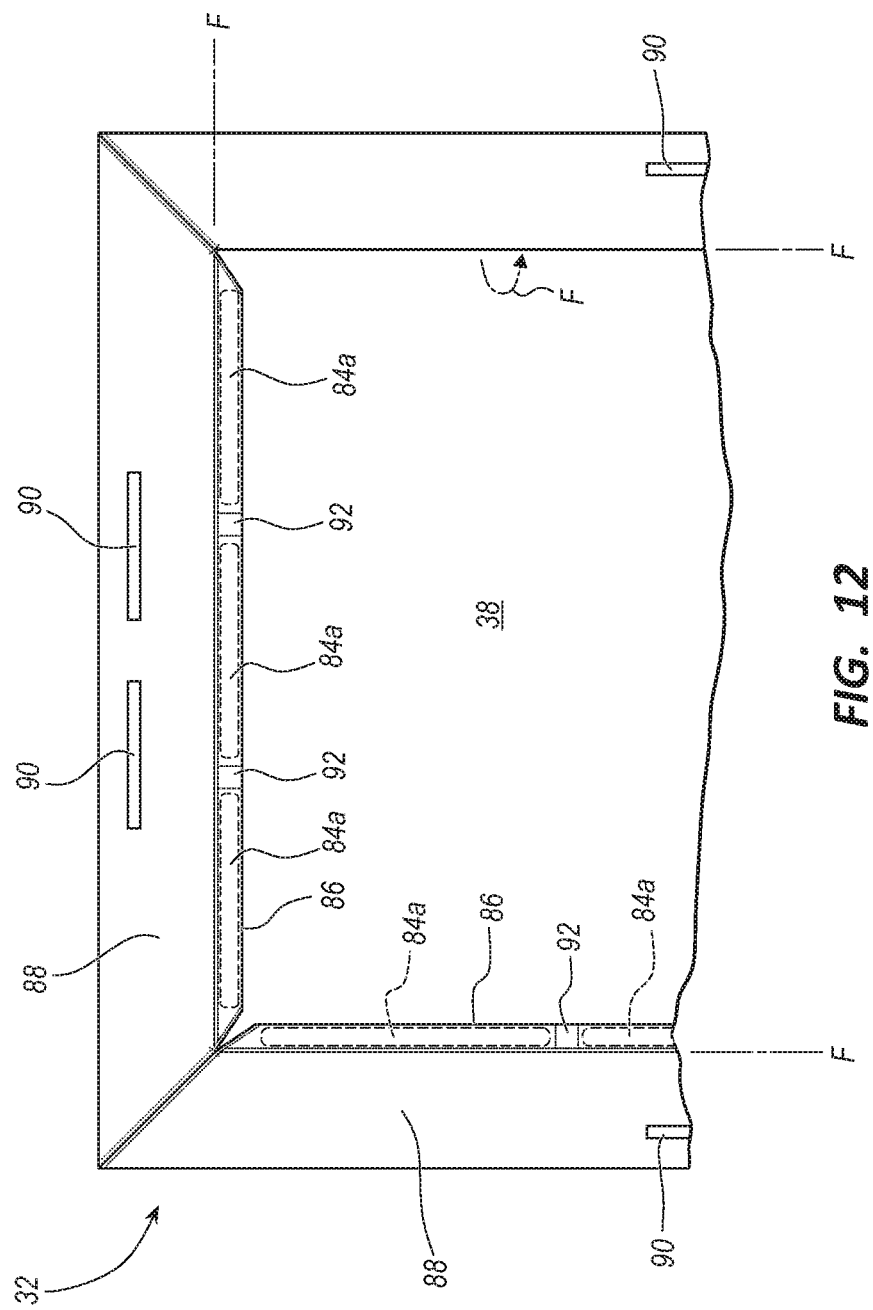
FIG. 12 illustrates a close-up, top plan cutaway view of an embodiment of a storage base frame with a base frame cover positioned over, and partially attached to the base frame.

As shown in FIG. 12, the configuration of at least two or more grasping strips 84 inlaid on each flap 86 and punctuated by spaces 92 between the strips imparts the flaps 86 with a degree of stiffness and/or thickness, enabling the user to easily apply a base frame cover 88 or a lid cover 52 to a storage base frame 32 or lid 22. Additionally, the spaces 92 allow for the furniture covers to be folded for more efficient shipping and storage, as illustrated in FIGS. 13 and 14.

FIG. 13 illustrates a method of folding base frame furniture covers, illustrating that the spaces between the grasping strips of the present invention enable convenient folding of the covers. FIG. 14 illustrates a method of folding various covers of the present invention, further illustrating that the spaces between the grasping strips of the present invention enable convenient folding of the covers.

FIGS. 13 and 14 illustrate examples of methods of folding a base frame cover 88 (see FIG. 13), a lid cover 52, a cushion cover 60, and a back pillow cover 94 (see FIG. 14) together as a furniture cover set 96. Each piece of the furniture cover set 96 can be folded and/or shipped individually apart from the set.

As shown in FIG. 13, the base frame cover 88 can be folded along fold line 1 (F1), which runs between opposing spaces 92 between grasping strips 84. This folding pattern can continue (along fold lines F2 and F3) until the base frame cover 88 is folded to the desired size. It can thus be advantageous to have two or more spaces between respective grasping strips 84 to allow for more folds, however, if the strips 84 are punctuated with too many spaces 92, the strips 84 may no longer provide adequate support to tighten the flaps 86. In some embodiments, each flap 86 can contain at least two strips 84 with spaces 92 therebetween, at least three strips 84 with spaces 92 therebetween, at least four strips 84 with spaces 92 therebetween. For example, each flap 86 can contain from 2 to 6 strips 84, from 2 to 5 strips 84, from 2 to 4 strips 84. In the illustrated embodiment, there are 3 strips, with 2 separating spaces therebetween, along each side.

Following are some further examples of embodiments of the invention. These are presented only by way of example and are not intended to limit the scope of the invention in any way.

Embodiment 1

A furniture assembly, comprising a transverse member and a base member, the base member comprising a base frame having a bottom panel and side panels, each of the side panels having an upper chamfered edge, a storage cavity at least partially defined by the bottom panel and the side panels, and a lid configured to be selectively mounted on the base frame, such that the lid covers the storage cavity.

Embodiment 2

The furniture assembly as recited in Embodiment 1, wherein the lid comprises one or more lower chamfered edges, each of the one or more lower chamfered edges of the lid corresponding to one of the upper chamfered edges.

Embodiment 3

The furniture assembly as recited in any of Embodiments 1-2, wherein the lower chamfered edges of the lid and the upper chamfered edges of the base frame are chamfered at an angle, the lower chamfered edges and the upper chamfered edges sloping downward toward the storage cavity.

Embodiment 4

The furniture assembly of any of Embodiments 1-3, wherein wherein the angle is between about 10 and 60 degrees.

Embodiment 5

The furniture assembly of any of Embodiments 1-4, wherein the angle is between about 20-degrees and 50-degrees.

Embodiment 6

The furniture assembly of any of Embodiments 1-5, wherein the angle is between about 30-degrees and 40-degrees.

Embodiment 7

The furniture assembly of any of Embodiments 1-6, wherein a contacting length between the lower chamfered edge of the lid and the upper chamfered edge of the base frame is from about 0.5 inch to about 4 inches.

Embodiment 8

The furniture assembly of any of Embodiments 1-7, wherein a contacting length between the lower chamfered edge of the lid and the upper chamfered edge of the side panel is from about 1 inch to about 3 inches.

Embodiment 9

The furniture assembly of any of Embodiments 1-8, wherein the bottom panel comprises one or more apertures configured to allow air to enter and escape the storage cavity through the bottom panel.

Embodiment 10

The furniture assembly of any of Embodiments 1-9, wherein the lid comprises a lid frame extending around a perimeter of the lid, and a spring system connected to the lid frame and extending across the lid.

Embodiment 11

The furniture assembly of any of Embodiments 1-10, further comprising a cushion configured to be mounted on the lid during use, the cushion comprising a cover.

Embodiment 12

The furniture assembly of any of Embodiments 1-11, wherein the base frame or lid has a cover including grasping strips within the flaps thereof for use in mounting the cover.

Embodiment 13

The furniture assembly of any of Embodiments 1-12, the cover comprising a lower portion extending over a lower side of the cushion, the lower portion of the cover having an inside surface, the inside surface facing the cushion disposed within the cover; and a plurality of pockets, each pocket disposed on an inside surface in a corner of the lower portion, wherein the lid is disposed within the cover, between the lower portion of the cover and the cushion, each of a plurality of corners of the lid being inserted into one of the plurality of pockets such that the lid is secured to the cushion via the cover.

Embodiment 14

The furniture assembly of any of Embodiments 1-13, wherein the furniture assembly is a modular furniture assembly.

Embodiment 15

The furniture assembly of any of Embodiments 1-14, wherein the modular furniture assembly can be assembled and reassembled in a variety of different positions such that different furniture configurations can be formed and such that the transverse member can selectively serve as either a backrest or an armrest.

Embodiment 16

The furniture assembly of an of Embodiments 1-15, wherein the furniture assembly is a modular furniture assembly, wherein the transverse member can be positioned in multiple locations in relation to the base to thereby form different furniture assemblies.

Embodiment 17

The furniture assembly of any of Embodiments 1-16, wherein the base frame or lid has a cover including grasping strips within the ends thereof for use in mounting the cover.

Embodiment 18

A modular furniture system, comprising a base including a base frame and a lid, the lid providing a seating surface; a transverse member having a height that is substantially greater than the height of the seating surface of the base member; a coupler for selectively coupling the base to the transverse member; and wherein the base frame is open at a top thereof and substantially closed at a bottom thereof, providing an accessible storage cavity beneath the seating surface; wherein upper edges of the base frame are chamfered at an angle and lower edges of the lid are correspondingly chamfered at the angle so that the lid selectively nests onto the base frame.

Embodiment 19

The modular furniture system as recited in Embodiment 18, wherein the corresponding angles of the base frame and lid help the lid position itself and nest into the base frame.

Embodiment 20

The modular furniture system of any of Embodiments 18-19, wherein at least a portion of the lid comprises a flexible portion that resiliently flexes downward in the direction of the storage cavity in reaction to forces pressing downward on the lid; and the base frame includes one or more apertures through which air can enter and escape from the storage cavity when the flexible portion of the lid flexes downward.

Embodiment 21

The modular furniture system of any of Embodiments 18-20, wherein the lid is secured to a bottom surface of the cushion via a cushion cover.

Embodiment 22

The modular furniture system of any of Embodiments 18-21, wherein the lid is secured to the cushion such that the lid holds down one or more corners of the cushion against a top of the base frame when a force pushes downward on the cushion during use.

Embodiment 23

The modular furniture system of any of Embodiments 18-22, wherein the lid and storage cavity are hidden from view when a user uses the modular furniture system for seating.

Embodiment 24

The modular furniture system of any of Embodiments 18-23, wherein the lid is housed within an outer fabric cover of a cushion selectively positionable over the seating surface of the base, the outer fabric cover including interior pockets for receiving corners of the lid, the pockets retaining the lid within the outer fabric cover of the cushion during use.

Embodiment 25

The modular furniture system of any of Embodiments 18-24, wherein the interior pockets are triangular, the corners of the lid being received into hypotenuse sides of the triangular pockets.

Embodiment 26

The modular furniture system of any of Embodiments 18-25, wherein the transverse member can be positioned in multiple locations in relation to the base to thereby form different furniture assemblies.

Embodiment 27

The system of any of Embodiments 18-26, wherein a contacting length between the edge of the lid and the chamfered upper perimeter edge of the base frame is from about 0.5 inch to about 4 inches.

Embodiment 28

A modular furniture system comprising: a base including a base frame, the base frame having an upper perimeter edge defining a top plane of the base; a transverse member having a height that is substantially greater than the height of the upper perimeter edge; a coupler for selectively coupling the base to the transverse member, wherein the transverse member can be coupled to the base in a plurality of different locations with respect to the base such that different furniture assemblies can be formed; wherein the base includes an open top, providing an accessible storage cavity beneath the top plane of the base, and wherein the open top of the frame of the base is selectively covered by a lid that nests into the base, and wherein at least one of the base frame or the lid has a cover including a grasping strip within a flap thereof for use in mounting the cover.

Embodiment 29

The modular furniture system of Embodiment 28, wherein the lid includes a chamfered perimeter edge, the upper perimeter edge of the base frame being correspondingly chamfered, such that the chamfered perimeter edge of the lid rests on the chamfered upper perimeter edge of the base frame, and when the lid nests into the top of the frame, a top surface of the lid is level with or below the top plane of the base.

Embodiment 30

The modular furniture system of any of Embodiments 28-29, wherein a contacting length between the chamfered perimeter edge of the lid and the chamfered upper perimeter edge of the base frame is from about 0.5 inch to about 4 inches.

Embodiment 31

The modular furniture system of any of Embodiments 28-30, wherein a contacting length between the chamfered perimeter edge of the lid and the chamfered upper perimeter edge of the base frame is from about 1 inch to about 3 inches.

Embodiment 32

The modular furniture system of any of Embodiments 28-31, wherein the substantially closed bottom of the base is formed from a molded grid member having airflow openings formed therein.

Embodiment 33

The modular furniture system of any of Embodiments 28-32, wherein the sides of the base frame include ventilation slits formed therein through which air can enter and escape the storage cavity.

Embodiment 34

The modular furniture system of any of Embodiments 28-33, wherein the system includes a base frame cover configured to be applied to the exterior of the base, the base frame cover comprising, a tube-shape having an open top end and an open bottom end for receiving a base, a plurality of flaps extending from the upper section and the lower section of the base frame cover, at least two grasping strips associated with an end of each flap of the plurality of flaps, wherein the at least two strips are separated by a space, and an attachment structure is disposed on each flap of the plurality of flaps.

Embodiment 35

The modular furniture system of any of Embodiments 28-34, wherein the system includes a lid cover configured to be applied to the lid, the lid cover comprising, a material section sized to fully cover a top surface of the lid, at least one flap extending outward from each side of the material section, at least two grasping strips associated with an outermost edge of the at least one flap, wherein the at least two strips are separated by a space, and an attachment structure is disposed on the at least one flap.

Embodiment 36

The modular furniture system of any of Embodiments 28-35, wherein the grasping strip is a furniture cover support, the support having a first end and a second end, and an elongate length extending along a longitudinal axis disposed between the first and second end.

Embodiment 37

The furniture cover support of Embodiments 28-36, wherein the grasping strip is torsionally stiff along its width and resiliently flexible along its length.

Embodiment 38

The furniture cover support of any of Embodiments 28-37, wherein the grasping strip is made of thermoplastic material.

Embodiment 39

The furniture cover support of any of Embodiments 28-38, wherein the grasping strip provides structure to a flap of a furniture cover.

Embodiment 40

The furniture cover support of any of Embodiments 28-39, wherein the furniture cover is a base frame cover and/or a lid cover.

Embodiment 41

A modular furniture system comprising: (A) a transverse member; (B) a base member; and (C) a coupler for selectively coupling the base to the transverse member, wherein the transverse member can be coupled to the base in multiple locations relative to the base such that the transverse member can be employed as a back rest or an arm rest within the modular furniture system, the base member comprising: (i) a base frame having a bottom panel and side panels, wherein the base frame is open at a top thereof, providing an accessible storage cavity, the storage cavity at least partially defined by the bottom panel and the side panels; and (ii) a suspension system configured to be selectively mounted on the base frame, and upon which a cushion can be mounted, wherein the cushion comprises a cushion cover configured to selectively receive the suspension system therein to thereby form an integrated cushion-suspension system seating assembly that is selectively mountable onto the base frame to cover the storage cavity, and that is selectively removable from the base frame as an integrated seating assembly Embodiment 42

The modular furniture system of embodiment 41, wherein the suspension system is mounted within the cushion cover adjacent a cushioning member for providing support to a user sitting on the base.

Embodiment 43

The modular furniture system of any of embodiments 41-42, wherein access to the storage cavity within the storage base can be achieved without removing the coupler that couples the transverse member to the base.

Embodiment 44

The modular furniture system of any of embodiments 41-43, wherein the seating assembly can be placed onto a base frame of the storage base without altering the connection between the base and the transverse member.

Embodiment 45

The modular furniture system of any of embodiments 41-44, wherein the storage base and the transverse member can be packaged, stored, and transported independently from each other.

Embodiment 46

The modular furniture system of any of embodiments 41-45, further comprising additional transverse members and additional couplers for coupling the additional transverse members to separate locations on the storage base.

Embodiment 47

The modular furniture system of any of embodiments 41-46, wherein the suspension system comprises one or more slats.

Embodiment 48

The modular furniture system of any of Embodiments 41-47, further comprising additional transverse members and additional couplers for coupling the additional transverse members to separate locations on the storage base.

Embodiment 49

The system of any of embodiments 41-48, wherein: the lid includes a chamfered perimeter edge, the upper perimeter edge of the base frame being correspondingly chamfered, such that the chamfered perimeter edge of the lid rests on the chamfered upper perimeter edge of the base frame; and when the lid nests into the top of the frame, a top surface of the lid is level with or below the top plane of the base, wherein a contacting length between the chamfered perimeter edge of the lid and the chamfered upper perimeter edge of the base frame is from about 0.5 inch to about 4 inches.

Embodiment 50

The modular furniture system of any of Embodiments 41-49, wherein the transverse member is selectively coupled to one or more sides of the base.

Embodiment 51

The modular furniture system of any of Embodiments 41-50, further comprising a second base that is selectively coupled to the base member, wherein the base member can be selectively coupled to the second base in a variety of different locations relative to the second base.

Embodiment 52

The system of any of embodiments 41-51, wherein access to the storage cavity within the storage base can be achieved without removing the coupler that couples the transverse member to the base.

Embodiment 53

The system of any of embodiments 41-52, wherein the suspension system is a lid, and wherein the lid can be placed onto a base frame of the storage base without altering the connection between the base and the transverse member.

Embodiment 54

The system of any of embodiments 41-53, wherein the base frame and/or suspension system has a cover including at least two grasping strips within the ends thereof for use in mounting the cover, the grasping strips separated by a space for use in folding the cover.

Embodiment 55

The system of any of embodiments 1-54, wherein the length of the base is substantially equal to the sum of the width of the base and the width of the transverse member, such that the transverse member is conveniently interchangeable as a backrest or arm rest in a variety of different furniture configurations. Using this length is substantially equal to the sum of the width of the base and the width of the transverse member configuration, a variety of furniture configurations can be formed from the base and transverse member, or from duplicates of those components, e.g., two bases 12 and four transverse members 14 to form a sofa, for example, or a variety of different furniture configurations such as shown in U.S. Pat. No. 7,213,885 which is incorporated herein by reference.

Embodiment 56

The system of any of embodiments 1-55, wherein access to the storage cavity within the storage base can be achieved without removing the coupler that couples the transverse member to the base.

Embodiment 57

The system of any of embodiments 1-56, wherein the suspension system (e.g., a lid) can be placed onto a base frame of the storage base without altering the connection between the base and the transverse member.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular furniture system comprising:
a base including a base frame, the base frame having an upper perimeter edge defining a top plane of the base;
a transverse member having a height that is substantially greater than the height of the upper perimeter edge;
a coupler for selectively coupling the base to the transverse member, wherein the transverse member can be coupled to the base in a plurality of different locations with respect to the base such that different furniture assemblies can be formed;
wherein the base frame includes an open top, providing an accessible storage cavity beneath the top plane of the base,
wherein the open top of the base frame of the base is selectively covered by a lid that nests into the base frame;
wherein at least one of the base frame or the lid has a cover including a first grasping strip within a flap thereof for use in mounting the cover; and
wherein the modular furniture system includes a base frame cover configured to be applied to an exterior of the base, the base frame cover comprising:
a tube-shape having an open top end and an open bottom end for receiving a base;
a plurality of flaps extending from an upper section and a lower section of the base frame cover;
at least second and third grasping strips fastened to an end of each flap of the plurality of flaps, wherein the at second and third grasping strips are separated by a space; and
an attachment structure is disposed on each flap of the plurality of flaps.

2. The system of claim 1, wherein:
the lid includes a chamfered perimeter edge, the upper perimeter edge of the base frame being correspondingly chamfered, such that the chamfered perimeter edge of the lid rests on the chamfered upper perimeter edge of the base frame; and
when the lid nests into the open top of the base frame, a top surface of the lid is level with or below the top plane of the base.

3. The system of claim 2, wherein a contacting length between the chamfered perimeter edge of the lid and the chamfered upper perimeter edge of the base frame is from about 0.5 inch to about 4 inches.

4. The system of claim 2, wherein the chamfered perimeter edge of the lid and the chamfered upper perimeter edge of the base frame are chamfered at an angle, the chamfered perimeter edge of the lid and the chamfered upper perimeter edge of the base frame sloping downward toward the storage cavity.

5. The system of claim 4, wherein the angle is between about 10 and about 60 degrees.

6. The system of claim 4, wherein the angle is between about 20 and 60 about degrees.

7. The system of claim 4, wherein the angle is between about 30 and 40 about degrees.

8. The system of claim 2, wherein a contacting length between the chamfered perimeter edge of the lid and the chamfered upper perimeter edge of the base frame is from about 1 inch to about 3 inches.

9. The system of claim 1, Wherein the system further includes a lid cover configured to be applied to the lid, the lid cover comprising:
a material section having a plurality of sides, sized to fully cover a top surface of the lid;
at least one flap extending outward from each side of the material section;
at least second and third grasping strips fastened to an outermost edge of the at least one flap, wherein the at least second and third grasping strips are separated by a space; and
attachment structure is disposed on the at least one flap.

10. The system of claim 1, wherein the first grasping strip is a furniture cover support, the support having a first end and a second end, and an elongate length extending along a longitudinal axis disposed between the first and second end.

11. The system of claim 1, wherein each grasping strip is torsionally stiff along its width and resiliently flexible along its length.

12. The system of claim 1, wherein access to the storage cavity within the base can be achieved without removing the coupler that couples the transverse member to the base.

13. The system of claim 12, wherein the lid can be placed onto the base frame of the base without altering a connection between the base and the transverse member.

14. The system of claim 1, wherein a substantially closed bottom of the base frame is formed from a molded grid member having air flow openings formed therein.

15. The system of claim 1, wherein sides of the base frame include ventilation slits formed therein through which air can enter and escape the storage cavity.

16. The system of claim 1, wherein each grasping ship is made of thermoplastic material.

17. The system of claim 1, wherein the first grasping strip provides structure to the flap of the base frame cover.

18. The system of claim 1, wherein a bottom panel of the base frame comprises one or more apertures configured to allow air to enter and escape the storage cavity through the bottom panel.

19. The system of claim 1, wherein the lid comprises:
a lid frame extending around a perimeter of the lid; and
a spring system connected to the lid frame and extending across the lid.

20. The system of claim 19, further comprising a cushion configured to be mounted on the lid during use, the cushion comprising a cover.

21. The system of claim 20, wherein the transverse member can be coupled to the base in a plurality of different locations with respect to the base such that different furniture assemblies can be formed such that the transverse member can selectively serve as either a backrest or an armrest.

22. A modular furniture system comprising:
a base including a base frame, the base frame having an upper perimeter edge defining a top plane of the base;
a transverse member having a height that is substantially greater than the height of the upper perimeter edge;
a coupler for selectively coupling the base to the transverse member, wherein the transverse member can be coupled to the base in a plurality of different locations with respect to the base such that different furniture assemblies can be formed;
wherein the base frame includes an open top, providing an accessible storage cavity beneath the top plane of the base,
wherein the open top of the base frame of the base is selectively covered by a lid that nests into the base frame;
wherein at least one of the base frame or the lid has a cover including a first grasping strip within a flap thereof for use in mounting the cover; and wherein the modular furniture system further includes a lid cover configured to be applied to the lid, the lid cover comprising:

material section having a plurality of sides, sized to fully cover a top surface of the lid;

at least one flap extending outward from each side of the material section;

at least second and third grasping strips fastened to an outermost edge of the at least one flap, wherein the at least second and third grasping strips are separated by a space; and an attachment structure disposed on the at least one flap.

23. The system of claim 22, wherein the first grasping strip provides structure to the flap of the lid cover.

* * * * *